US011194775B2

(12) United States Patent
Mishra et al.

(10) Patent No.: US 11,194,775 B2
(45) **Date of Patent: *Dec. 7, 2021**

(54) EFFICIENT DATABASE SEARCH AND REPORTING, SUCH AS FOR ENTERPRISE CUSTOMERS HAVING LARGE AND/OR NUMEROUS FILES

(71) Applicant: Commvault Systems, Inc., Tinton Falls, NJ (US)

(72) Inventors: Hemant Mishra, Englishtown, NJ (US); Muthusamy Senthilnathan, Holmdel, NJ (US); Ravi Thati, Eatontown, NJ (US); Paramasivam Kumarasamy, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,020

(22) Filed: Apr. 23, 2020

(65) Prior Publication Data

US 2020/0320050 A1 Oct. 8, 2020

Related U.S. Application Data

(63) Continuation of application No. 14/848,463, filed on Sep. 9, 2015, now Pat. No. 10,754,837.

(51) Int. Cl.
*G06F 16/22* (2019.01)
*G06F 16/13* (2019.01)
(Continued)

(52) U.S. Cl.
CPC ............ *G06F 16/22* (2019.01); *G06F 3/0482* (2013.01); *G06F 16/134* (2019.01);
(Continued)

(58) Field of Classification Search
None
See application file for complete search history.

(56) References Cited

U.S. PATENT DOCUMENTS 4,686,620 A 8/1987 Ng
4,827,404 A 5/1989 Barstow et al.
(Continued)

FOREIGN PATENT DOCUMENTS

EP 0259912 3/1988
EP 0405926 1/1991
(Continued)

OTHER PUBLICATIONS

Kumarasamy, et al., U.S. Appl. No. 14/755,561 Published As 2016/0342661 A1 U.S. Pat. No. 10,324,914, filed Jun. 30, 2015, Handling User Queries Against Production And Archive Storage Systems, Such As For Enterprise Customers Having Large And/or Numerous Files.
(Continued)

*Primary Examiner* — Irene Baker
(74) *Attorney, Agent, or Firm* — Knobbe Martens Olson & Bear LLP

(57) ABSTRACT

This application discloses a server for handling data reporting requests in a system that also comprises storage managers, primary storage devices, and secondary storage devices connected over one or more networks. The server receives, from each storage manager, a copy of data associated with the storage manager, and stores the received copies in one or more local databases. The server builds offline one or more indices for part or all of the received copies to improve query processing against the one or more local databases. Next, the server receives a request over a network from one of the storage managers or a standalone console, which received the request from a user for a report of data associated with the storage managers. The server
(Continued)

produces a data report in response to the request, using the one or more indices and without impacting performance of the storage managers.

20 Claims, 15 Drawing Sheets

(51) Int. Cl.

*G06F 16/182* (2019.01)
*G06F 16/21* (2019.01)
*G06F 16/248* (2019.01)
*G06F 16/25* (2019.01)
*G06F 16/28* (2019.01)
*G06F 16/242* (2019.01)
*G06F 16/2452* (2019.01)
*G06F 16/2455* (2019.01)
*G06F 16/2457* (2019.01)
*G06F 3/0482* (2013.01)

(52) U.S. Cl.

CPC .......... *G06F 16/182* (2019.01); *G06F 16/214* (2019.01); *G06F 16/219* (2019.01); *G06F 16/2264* (2019.01); *G06F 16/248* (2019.01); *G06F 16/2423* (2019.01); *G06F 16/2452* (2019.01); *G06F 16/2455* (2019.01); *G06F 16/24575* (2019.01); *G06F 16/252* (2019.01); *G06F 16/283* (2019.01)

(56) References Cited

U.S. PATENT DOCUMENTS 4,995,035 A 2/1991 Cole et al.
5,005,122 A 4/1991 Griffin et al.
5,093,912 A 3/1992 Dong et al.
5,133,065 A 7/1992 Cheffetz et al.
5,193,154 A 3/1993 Kitajima et al.
5,212,772 A 5/1993 Masters
5,226,157 A 7/1993 Nakano et al.
5,239,647 A 8/1993 Anglin et al.
5,241,668 A 8/1993 Eastridge et al.
5,241,670 A 8/1993 Eastridge et al.
5,276,860 A 1/1994 Fortier et al.
5,276,867 A 1/1994 Kenley et al.
5,287,500 A 2/1994 Stoppani, Jr.
5,321,816 A 6/1994 Rogan et al.
5,333,315 A 7/1994 Saether et al.
5,347,653 A 9/1994 Flynn et al.
5,410,700 A 4/1995 Fecteau et al.
5,448,724 A 9/1995 Hayashi et al.
5,491,810 A 2/1996 Allen
5,495,607 A 2/1996 Pisello et al.
5,504,873 A 4/1996 Martin et al.
5,544,345 A 8/1996 Carpenter et al.
5,544,347 A 8/1996 Yanai et al.
5,559,957 A 9/1996 Balk
5,619,644 A 4/1997 Crockett et al.
5,638,509 A 6/1997 Dunphy et al.
5,673,381 A 9/1997 Huai et al.
5,678,042 A 10/1997 Pisello et al.
5,699,361 A 12/1997 Ding et al.
5,729,743 A 3/1998 Squibb
5,751,997 A 5/1998 Kullick et al.
5,758,359 A 5/1998 Saxon
5,761,677 A 6/1998 Senator et al.
5,764,972 A 6/1998 Crouse et al.
5,778,395 A 7/1998 Whiting et al.
5,781,703 A 7/1998 Desai et al.
5,805,155 A 9/1998 Allibhoy et al.
5,812,398 A 9/1998 Nielsen
5,813,009 A 9/1998 Johnson et al.
5,813,017 A 9/1998 Morris
5,815,652 A 9/1998 Ote et al.
5,875,478 A 2/1999 Blumenau
5,887,134 A 3/1999 Ebrahim
5,901,327 A 5/1999 Ofek
5,924,102 A 7/1999 Perks
5,950,205 A 9/1999 Aviani, Jr.
5,954,829 A 9/1999 McLain et al.
5,974,563 A 10/1999 Beeler, Jr.
6,003,078 A 12/1999 Kodimer et al.
6,021,415 A 2/2000 Cannon et al.
6,026,414 A 2/2000 Anglin
6,044,476 A 3/2000 Ote et al.
6,052,735 A 4/2000 Ulrich et al.
6,076,148 A 6/2000 Kedem et al.
6,094,416 A 7/2000 Ying
6,131,095 A 10/2000 Low et al.
6,131,147 A 10/2000 Takagi
6,131,190 A 10/2000 Sidwell
6,145,096 A 11/2000 Bereiter et al.
6,148,412 A 11/2000 Cannon et al.
6,154,787 A 11/2000 Urevig et al.
6,161,111 A 12/2000 Mutalik et al.
6,167,402 A 12/2000 Yeager
6,199,074 B1 3/2001 Kern et al.
6,212,512 B1 4/2001 Barney et al.
6,226,760 B1 5/2001 Burkhardt et al.
6,260,069 B1 7/2001 Anglin
6,269,431 B1 7/2001 Dunham
6,275,953 B1 8/2001 Vahalia et al.
6,301,592 B1 10/2001 Aoyama et al.
6,324,581 B1 11/2001 Xu et al.
6,328,766 B1 12/2001 Long
6,330,570 B1 12/2001 Crighton et al.
6,330,642 B1 12/2001 Carteau
6,338,149 B1 1/2002 Ciccone et al.
6,343,324 B1 1/2002 Hubis et al.
RE37,601 E 3/2002 Eastridge et al.
6,356,801 B1 3/2002 Goodman et al.
6,357,017 B1 3/2002 Bereiter et al.
6,389,432 B1 5/2002 Pothapragada et al.
6,418,478 B1 7/2002 Ignatius et al.
6,421,711 B1 7/2002 Blumenau et al.
6,477,667 B1 11/2002 Levi et al.
6,487,561 B1 11/2002 Ofek et al.
6,519,679 B2 2/2003 Devireddy et al.
6,523,032 B1 2/2003 Sunkara et al.
6,538,669 B1 3/2003 Lagueux, Jr. et al.
6,542,972 B2 4/2003 Ignatius et al.
6,564,228 B1 5/2003 O'Connor
6,615,240 B1 9/2003 Sullivan et al.
6,625,747 B1 9/2003 Tawil et al.
6,658,436 B2 12/2003 Oshinsky et al.
6,658,526 B2 12/2003 Nguyen et al.
6,697,969 B1 2/2004 Merriam
6,750,879 B2 6/2004 Sandberg
6,771,595 B1 8/2004 Gilbert et al.
6,820,035 B1 11/2004 Zahavi
6,915,506 B2 7/2005 Dhong et al.
6,959,368 B1 10/2005 St. Pierre et al.
6,976,193 B2 12/2005 Dubal
7,007,042 B2 2/2006 Lubbers et al.
7,035,880 B1 4/2006 Crescenti et al.
7,039,827 B2 5/2006 Meyer et al.
7,082,441 B1 7/2006 Zahavi et al.
7,085,904 B2 8/2006 Mizuno et al.
7,089,451 B2 8/2006 Ote et al.
7,093,089 B2 8/2006 de Brebisson
7,093,194 B2 8/2006 Nelson
7,096,269 B2 8/2006 Yamagami
7,096,315 B2 8/2006 Takeda
7,103,740 B1 9/2006 Colgrove et al.
7,130,970 B2 10/2006 Devassy et al.
7,146,377 B2 12/2006 Nowicki et al.
7,171,459 B2 1/2007 Sanghvi
7,197,490 B1 3/2007 English
7,203,944 B1 4/2007 van Rietschote et al.
7,213,040 B1 5/2007 Stokes et al.
7,216,244 B2 5/2007 Amano
7,225,356 B2 5/2007 Monitzer
7,243,093 B2 7/2007 Cragun et al.

(56) References Cited

U.S. PATENT DOCUMENTS 7,275,103 B1 9/2007 Thrasher et al.
7,287,063 B2 10/2007 Baldwin et al.
7,328,260 B1 2/2008 Muthiyan et al.
7,343,356 B2 3/2008 Prahlad et al.
7,343,453 B2 3/2008 Prahlad et al.
7,343,459 B2 3/2008 Prahlad et al.
7,346,623 B2 3/2008 Prahlad et al.
7,346,751 B2 3/2008 Prahlad et al.
7,353,533 B2 4/2008 Wright et al.
7,373,415 B1 5/2008 DeShan et al.
7,395,282 B1 7/2008 Crescenti et al.
7,401,064 B1 7/2008 Arone et al.
7,401,338 B1 7/2008 Bowen et al.
7,403,987 B1 7/2008 Marinelli et al.
7,454,569 B2 11/2008 Kavuri et al.
7,478,420 B2 1/2009 Wright et al.
7,493,300 B2 2/2009 Palmer et al.
7,526,800 B2 4/2009 Wright et al.
7,546,323 B1 6/2009 Timmins et al.
7,565,661 B2 7/2009 Sim-Tang
7,606,844 B2 10/2009 Kottomtharayil
7,636,936 B2 12/2009 Wright et al.
7,640,496 B1 12/2009 Chaulk et al.
7,644,245 B2 1/2010 Prahlad et al.
7,685,128 B2 3/2010 Anderson et al.
7,747,985 B2 6/2010 Campbell et al.
7,765,167 B2 7/2010 Prahlad et al.
7,779,021 B1 8/2010 Smith et al.
7,917,695 B2 3/2011 Ulrich et al.
7,934,071 B2 4/2011 Abe et al.
7,945,810 B2 5/2011 Soran et al.
8,020,192 B2 9/2011 Wright et al.
8,060,587 B2 11/2011 Ahmad et al.
8,086,907 B1 12/2011 Narin et al.
8,112,605 B2 2/2012 Kavuri
8,195,800 B2 6/2012 Tameshige et al.
8,255,418 B2 8/2012 Fuhry et al.
8,266,406 B2 9/2012 Kavuri
8,306,926 B2 11/2012 Prahlad et al.
8,315,981 B2 11/2012 Prahlad et al.
8,417,694 B2 4/2013 Bhagwan et al.
8,578,487 B2 11/2013 Soeder
8,706,993 B2 4/2014 Prahlad et al.
8,751,438 B2 6/2014 Kharod et al.
8,776,027 B2 7/2014 Ergan et al.
9,021,452 B2 4/2015 Kripalani et al.
9,208,474 B2 12/2015 McKeown et al.
9,298,715 B2 3/2016 Kumarasamy et al.
9,367,383 B2 6/2016 Henley et al.
9,613,120 B1 * 4/2017 Kharatishvili .......... G06F 16/23
9,633,025 B2 4/2017 Gokhale et al.
9,753,844 B2 9/2017 Kripalani et al.
9,760,446 B2 9/2017 Hammer et al.
10,089,337 B2 10/2018 Senthilnathan et al.
10,324,914 B2 6/2019 Kumarasamy et al.
10,459,710 B2 10/2019 Kripalani
10,956,299 B2 3/2021 Krishnan et al.
2001/0007138 A1 7/2001 Iida et al.
2001/0008021 A1 7/2001 Ote et al.
2002/0087633 A1 7/2002 Nelson
2002/0120886 A1 8/2002 Nguyen et al.
2002/0143999 A1 10/2002 Yamagami
2002/0198765 A1 12/2002 Margrino et al.
2003/0065759 A1 4/2003 Britt et al.
2003/0093408 A1 * 5/2003 Brown ................ G06F 16/2272
2003/0115509 A1 6/2003 Dubai
2003/0145248 A1 7/2003 McNeil
2004/0103088 A1 5/2004 Cragun et al.
2004/0123153 A1 6/2004 Wright et al.
2005/0055578 A1 3/2005 Wright et al.
2005/0091369 A1 4/2005 Jones
2005/0102569 A1 5/2005 Wu et al.
2005/0108294 A1 * 5/2005 Koerner ................ G06F 16/283
2005/0193055 A1 9/2005 Angel et al.
2005/0203887 A1 9/2005 Joshi et al.
2005/0278202 A1 12/2005 Broomhall et al.
2006/0010427 A1 1/2006 Hoffman
2006/0053263 A1 3/2006 Prahlad et al.
2006/0106641 A1 5/2006 Bartsch et al.
2006/0265385 A1 11/2006 Agrawal et al.
2007/0043715 A1 2/2007 Kaushik et al.
2007/0088572 A1 4/2007 Susai et al.
2007/0143371 A1 6/2007 Kottomtharayil
2007/0185914 A1 * 8/2007 Prahlad ................ G06F 16/122
2007/0203933 A1 8/2007 Iversen et al.
2007/0283194 A1 12/2007 Villella et al.
2007/0294272 A1 * 12/2007 Anderson .......... G06F 16/2272
2007/0297418 A1 12/2007 Lee
2008/0046965 A1 2/2008 Wright et al.
2008/0052395 A1 2/2008 Wright et al.
2008/0077971 A1 3/2008 Wright et al.
2008/0109679 A1 5/2008 Wright et al.
2008/0120688 A1 5/2008 Qiu et al.
2008/0189162 A1 8/2008 Ganong et al.
2008/0209280 A1 8/2008 Dilillo et al.
2008/0295095 A1 11/2008 Watanabe et al.
2009/0037914 A1 2/2009 Chagoly et al.
2009/0248614 A1 10/2009 Bhagwan et al.
2009/0254593 A1 10/2009 Halim et al.
2009/0307283 A1 12/2009 Lehr et al.
2009/0319534 A1 12/2009 Gokhale
2010/0005259 A1 1/2010 Prahlad et al.
2010/0011256 A1 1/2010 Nakajima
2010/0186020 A1 7/2010 Maddhirala et al.
2010/0250504 A1 9/2010 Balasubramanian et al.
2010/0257140 A1 10/2010 Davis et al.
2010/0257412 A1 10/2010 Acuna et al.
2010/0281005 A1 * 11/2010 Carlin .................... G06F 16/22 707/696
2010/0312754 A1 12/2010 Bear et al.
2010/0332453 A1 12/2010 Prahlad et al.
2011/0010518 A1 1/2011 Kavuri et al.
2011/0125715 A1 5/2011 Kottomtharayil et al.
2011/0145207 A1 6/2011 Agrawal et al.
2011/0213775 A1 9/2011 Franke et al.
2012/0005542 A1 1/2012 Petersen et al.
2012/0101952 A1 4/2012 Raleigh et al.
2012/0117644 A1 5/2012 Soeder
2012/0150810 A1 6/2012 Yu et al.
2012/0151450 A1 6/2012 Saffer et al.
2013/0006883 A1 1/2013 McKeown et al.
2013/0042256 A1 2/2013 Qian et al.
2013/0054642 A1 2/2013 Morin
2013/0151476 A1 6/2013 Brannon et al.
2013/0159281 A1 * 6/2013 Yang ...................... G06F 16/22 707/715
2013/0227352 A1 8/2013 Kumarasamy et al.
2013/0238562 A1 9/2013 Kumarasamy et al.
2013/0275360 A1 10/2013 Kharod et al.
2013/0282672 A1 10/2013 Tashiro et al.
2014/0012975 A1 1/2014 Wang et al.
2014/0181078 A1 6/2014 Ghazal et al.
2014/0181085 A1 6/2014 Gokhale et al.
2014/0181442 A1 6/2014 Kottomtharayil et al.
2014/0207753 A1 7/2014 Fox
2014/0237454 A1 8/2014 Delporte
2014/0281760 A1 9/2014 Yoshizawa et al.
2014/0317063 A1 10/2014 Patterson
2015/0033073 A1 1/2015 Yang et al.
2015/0100557 A1 * 4/2015 Golod ................ G06F 16/2343 707/696
2015/0178351 A1 * 6/2015 Clevenger .......... G06F 16/2453 707/715
2015/0186441 A1 * 7/2015 Chang ................ G06F 16/2272 707/696
2015/0199265 A1 7/2015 Kripalani
2015/0199367 A1 7/2015 Hammer et al.
2015/0242264 A1 8/2015 Vibhor et al.
2015/0244775 A1 8/2015 Vibhor et al.
2016/0066189 A1 3/2016 Mahaffey et al.
2016/0092286 A1 3/2016 Henley et al.
2016/0092338 A1 3/2016 Henley et al.
2016/0253254 A1 9/2016 Krishnan et al.
2016/0342655 A1 11/2016 Mishra et al.

(56) References Cited

U.S. PATENT DOCUMENTS

| | | | |
|---|---|---|---|
| 2016/0373588 | A1 | 12/2016 | Raleigh et al. |
| 2017/0199884 | A1 | 7/2017 | Gokhale et al. |
| 2018/0074910 | A1 | 3/2018 | Hammer et al. |
| 2018/0074948 | A1 | 3/2018 | Kripalani et al. |
| 2018/0270290 | A1 | 9/2018 | Sinha |
| 2018/0285214 | A1 | 10/2018 | Ashraf |
| 2019/0042609 | A1 | 2/2019 | Senthilnathan et al. |
| 2019/0266139 | A1 | 8/2019 | Kumarasamy et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO9513580 | 5/1995 |
| WO | WO9912098 | 3/1999 |
| WO | WO2007021842 | 2/2007 |

OTHER PUBLICATIONS

Kumarasamy, et al., U.S. Appl. No. 16/408,305 Published As 2019/0266139 A1, filed May 9, 2019, Handling User Queries Against Production And Archive Storage Systems, Such As For Enterprise Customers Having Large And/or Numerous Files.

Senthilnathan, et al., U.S. Appl. No. 14/810,546 Published As 2016/0342633 A1 U.S. Pat. No. 10,089,337, filed Jul. 28, 2015, Predicting Scale Of Data Migration Between Production And Archive Storage Systems, Such As For Enterprise Customers Having Large And/or Numerous Files.

Senthilnathan, et al., U.S. Appl. No. 16/057,763 Published As 2019/0042609 A1, filed Aug. 7, 2018, Predicting Scale Of Data Migration.

Mishra, et al., U.S. Appl. No. 14/848,463 Published As 2016/0342655 A1, filed Sep. 9, 2015, Efficient Database Search And Reporting, Such As For Enterprise Customers Having Large And/or Numerous Files.

Mishra, et al., U.S. Appl. No. 16/857,020, filed Apr. 23, 2020, Efficient Database Search And Reporting, Such As For Enterprise Customers Having Large And/or Numerous Files.

TechTarget. WayBack Machine. "Definition: Data Archiving". Snapshot taken on Feb. 7, 2012. URL Link: https://web.archive.org/web/20120207133158/http://searchdatabackup.techtarget.com/definition/data-archiving. Retrieved Jan. 2018.

"2003 GOLD: CommVault QiNetix4.2," SearchStorage.com, downloaded from: searchstorage.techtarget.com/news/article/0,289142,sid5 gci942854,00.html, Dec. 30, 2003, pp. 1-3.

"CommVault QiNetix: Dynamic Data Management," Product brochure downloaded from: www.stephord.com/book%5CQiNetix_Brochure.pdf, CommVault Systems, Inc., © 2003, pp. 1-6.

"CommVault QiNetix: Galaxy Backup and Recovery-Data Protection," Product brochure downloaded from: www .hitachidatasystems.com/assets/pdf/ProductTriF old_ Galaxy .pdf, CommVault Systems, Inc., © 2002, pp. 1-5.

"CommVault QiNetix: Galaxy iDataAgent for SharePoint Portal Server," Product brochure downloaded from: directory .partners.extranet.microsoft.com/collaterai/2123/DS_ GBR_ MSFTSPPServer.pdf, CommVault Systems, Inc., © 2002, pp. 1-2.

Agrawal, Dakshi, et al., "Policy-Based Validation of SAN Configuration", POLICY '04, Jun. 7-9, 2004, pp. 77-86.

An integrated data management approach to manage health care data; Guerra et al.; Proceedings of the Third ACM International Conference on Distributed Event-Based Systems; Jul. 6-9, 2009; Article No. 40 (Year: 2009).

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Beck, Micah, et al., "The Internet2 Distributed Storage Infrastructure Project: An Architecture for Internet Content Channels", Computer Networks and ISDN Systems, vol. 30, Issues 22-23, Nov. 1998, pp. 2141-2148.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Charlu, Daniel, "HP Hyperplex Clustering Technology", Proc. of the 1st IEEE Computer Science Workshop on Cluster Computing, Melbourne, Australia, Dec. 2-3, 1999, pp. 347-356.

CommVault QiNetix/ILM Overview; Commvault; 2006; retrieved from http://www.azmag.gov/documents/pdf/cms.resource/2006-05-18_magtag_commvault_presentation27765.pdf on Jul. 18, 2016 (22 pages).

CommVault QiNetix: Dynamic Data Management, Product brochure downloaded from: www.stephord.com/book%5CQiNetix)Brochure.pdf, CommVault Systems, Inc., copyright 2003, pp. 1-6.

CommVault Simpana 8.0 Application Introduction; EMC Data Domain, Inc.; Dec. 14, 2011 retrieved from http://www.symstor.com/wp-content/uploads/2014/01/bpg_data_domain_commvault.pdf on Jul. 18, 2016 (86 pages).

Commvault's Second Generation Qinetix Suite Dramatically Advances Lifecycle Data Management; Netapp; Nov. 8, 2004; retrieved from http://www.netapp.com/US/company/news/press-releases/news-rel-20041108.aspx on Jul. 18, 2016 (8 pages).

Eitel, "Backup and Storage Management in Distributed Heterogeneous Environments," IEEE, Jun. 12-16, 1994, pp. 124-126.

Gait, J., "The Optical File Cabinet: A Random-Access File System For Write-Once Optical Disks," IEEE Computer, vol. 21, No. 6, pp. 11-22 (Jun. 1988).

Hirao, Tetsuhiro, et al., "Resource Management", Fujitsu Tech. J., vol. 40, No. 1, Jun. 2004, pp. 123-132.

Integrated Data Management and Analysis Environment for Medical Longitudinal Research with Machine Learning Based Prediction Models; Laaksonen et al.; 2009 WRI World Congress on Computer Science and Information Engineering; Mar. 21, 2009-Apr. 2, 2009 (Year: 2009).

Integrated Data Management: Building Information Modeling (BIM) in Malaysia Construction Industry; Sabri et al.; Proceedings of the 2018 7th International Conference on Software and Computer Applications;Feb. 8-10, 2018; pp. 139-142 (Year: 2018).

Jander, M., "Launching Storage-Area Net," *Data Communications*, US, McGraw Hill, NY, vol. 27, No. 4 (Mar. 21, 1998), pp. 64-72.

Kaczmarski, M., et al., "Beyond Backup Toward Storage Management", IBM Systems Journal, vol. 42, No. 2, Apr. 2003, pp. 322-337.

Menon, Jai, et al., "IBM Storage Tank-A Heterogeneous Scalable SAN File System", IBM Systems Journal, vol. 42 No. 2, © 2003, pp. 250-267.

No One Needs It, (Until They Need It) Implementing a New Desktop Backup Solution; Rycroft, Melissa E.; Proceedings of the 34th annual ACM SIGUCCS fall conference: expanding the boundaries; Nov. 5, 2006; pp. 347-352 (5 pages).

Research on the Enterprise' Model of Information Lifecycle Management Based on Enterprise Architecture; Liu et al.; 2009 Ninth International Conference on Hybrid Intelligent Systems; Aug. 12-14, 2009 (Year: 2009).

Rosenblum et al., "The Design and Implementation of a Log-Structured File System," *Operating Systems Review SIGOPS*, vol. 25, No. 5, New York, US, pp. 1-15 (May 1991).

Schultz, Nick, "QiNetixfrom CommVault", Computer Technology Review, Oct. 1, 2002, one page.

Silberschatz et al. "Operating System Concepts, 8th Edition". John Wiley & Sons. Jul. 29, 2008. ISBN-13: 978-0-470-12872-5. Accessed Aug. 2018.

(56) References Cited

OTHER PUBLICATIONS

Software Metric Estimation: An Empirical Study Using An Integrated Data Analysis Approach; Deng et al.; 2007 International Conference on Service Systems and Service Management; Jun. 9-11, 2007 (Year: 2007).
Supplementary European Search Report for 05745272.4, dated Mar. 16, 2010, 3 pages.
TechTerms. "Database". Last updated Oct. 27, 2009. URL Link: https://techterms.com/definition/database. Accessed Aug. 2018.
The selection of CRM systems in financial institutes using the analytic hierarchy; Hong et al.; 2nd International Conference on Digital Information Management; Oct. 28-31, 2007 (Year: 2007).
Woodford. "Computer memory". Apr. 18, 2015 snapshot via Archive.org. URL Link: https://www .explainthatstuff.com/how-computer-memory-works.html. Accessed Aug. 2018.

* cited by examiner

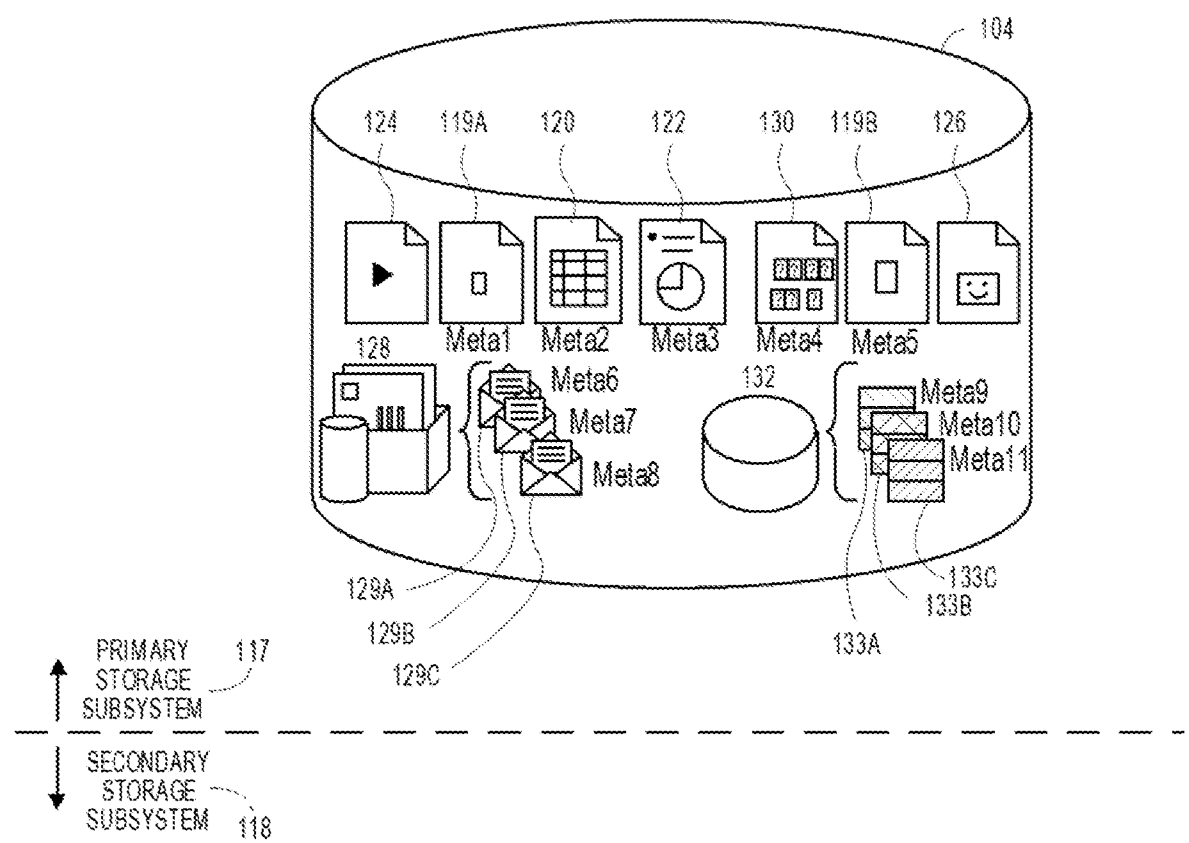
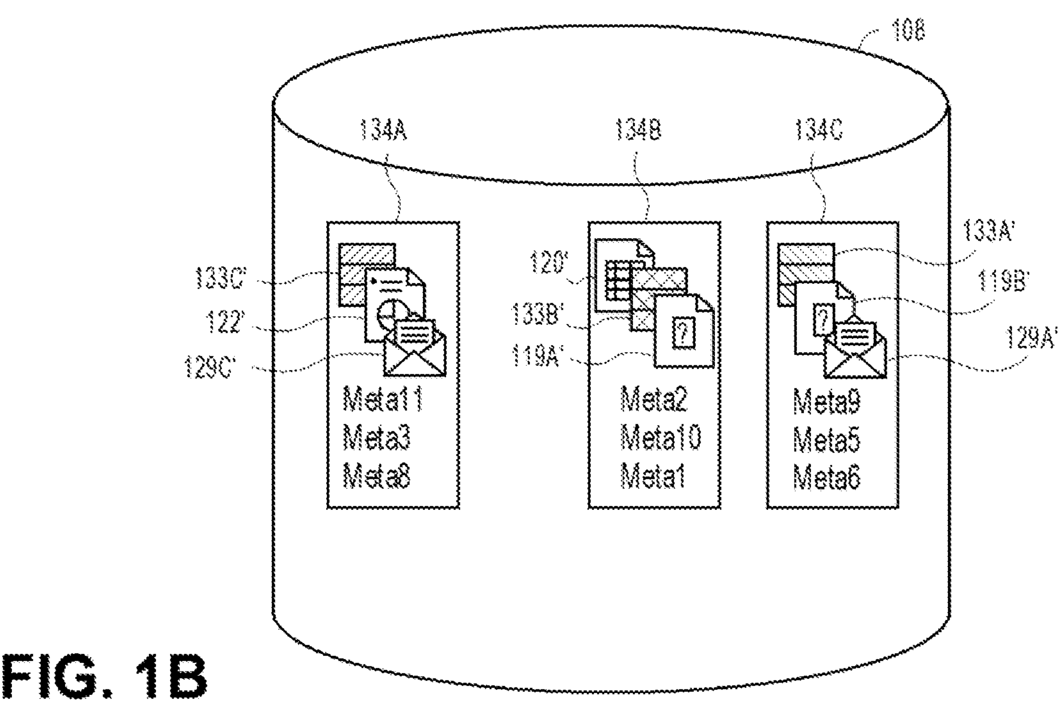
FIG. 1B

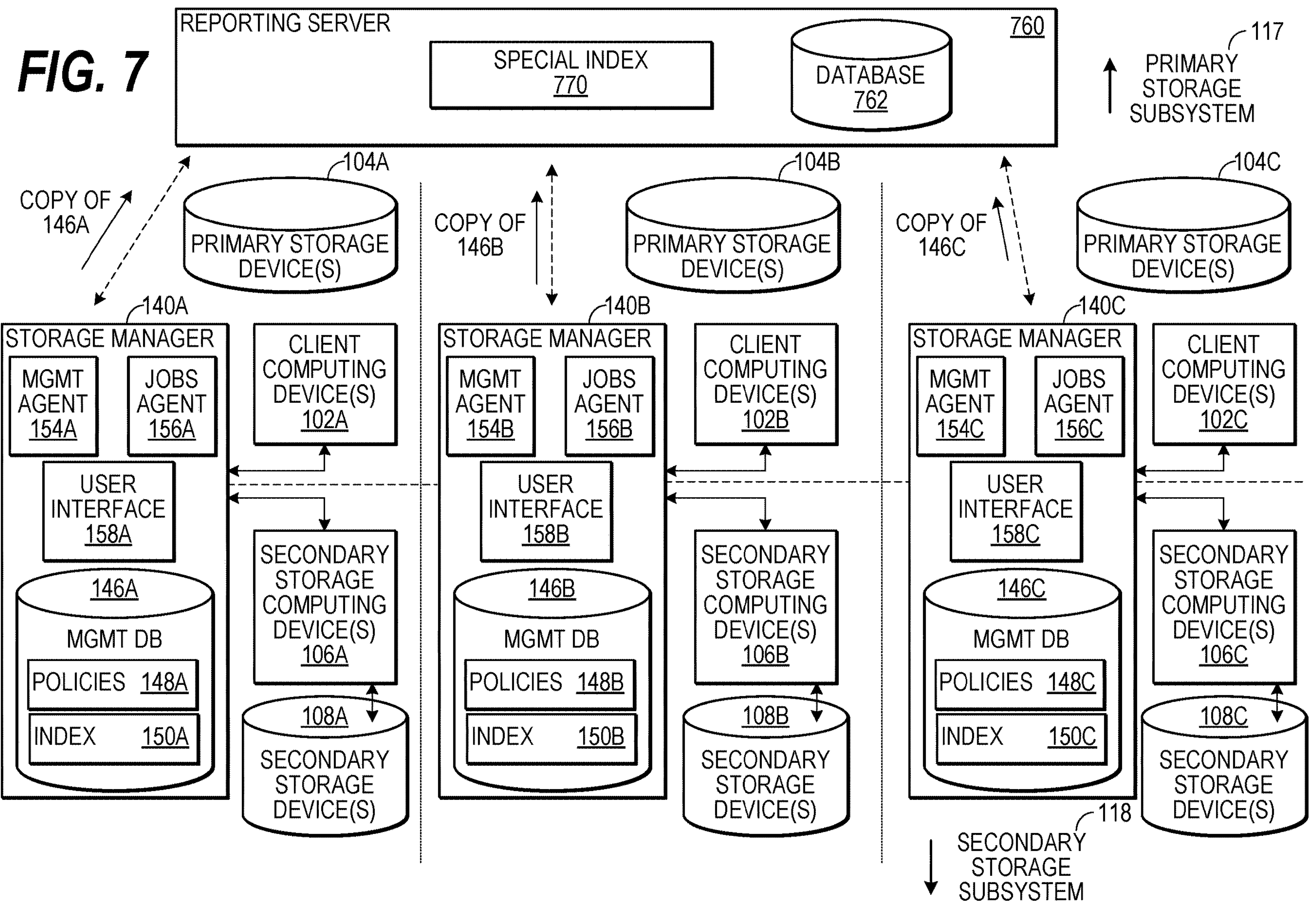
FIG. 7
REPORTING SERVER
760
SPECIAL INDEX
770
DATABASE
762
117
PRIMARY STORAGE SUBSYSTEM
COPY OF 146A
104A
PRIMARY STORAGE DEVICE(S)
COPY OF 146B
104B
PRIMARY STORAGE DEVICE(S)
COPY OF 146C
104C
PRIMARY STORAGE DEVICE(S)
140A
STORAGE MANAGER
MGMT AGENT 154A
JOBS AGENT 156A
USER INTERFACE 158A
146A
MGMT DB
POLICIES 148A
INDEX 150A
CLIENT COMPUTING DEVICE(S) 102A
SECONDARY STORAGE COMPUTING DEVICE(S) 106A
108A
SECONDARY STORAGE DEVICE(S)
140B
STORAGE MANAGER
MGMT AGENT 154B
JOBS AGENT 156B
USER INTERFACE 158B
146B
MGMT DB
POLICIES 148B
INDEX 150B
CLIENT COMPUTING DEVICE(S) 102B
SECONDARY STORAGE COMPUTING DEVICE(S) 106B
108B
SECONDARY STORAGE DEVICE(S)
140C
STORAGE MANAGER
MGMT AGENT 154C
JOBS AGENT 156C
USER INTERFACE 158C
146C
MGMT DB
POLICIES 148C
INDEX 150C
CLIENT COMPUTING DEVICE(S) 102C
SECONDARY STORAGE COMPUTING DEVICE(S) 106C
108C
SECONDARY STORAGE DEVICE(S)
118
SECONDARY STORAGE SUBSYSTEM

EFFICIENT DATABASE SEARCH AND REPORTING, SUCH AS FOR ENTERPRISE CUSTOMERS HAVING LARGE AND/OR NUMEROUS FILES

CROSS-REFERENCE TO RELATED APPLICATIONS

This application is a continuation of, and claims the benefit of priority to, U.S. patent application Ser. No. 14/848,463, filed Sep. 9, 2015 and titled "EFFICIENT DATABASE SEARCH AND REPORTING, SUCH AS FOR ENTERPRISE CUSTOMERS HAVING LARGE AND/OR NUMEROUS FILES," which is incorporated by reference in its entirety. This application also claims the benefit of priority to U.S. Pat. App. No. 62/164,438, filed May 20, 2015 and titled "HANDLING LARGE DATA FILES: ARCHIVE DATABASE DRIVERS, DATABASE ARCHIVE PREDICTIONS, AND FAST REPORTING, SUCH AS FOR ENTERPRISE CUSTOMERS HAVING LARGE AND/OR NUMEROUS FILES," which is also incorporated herein by reference in its entirety. Any and all applications, foreign or domestic, listed below or identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc. Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

The expanding volume of data makes organizing the data more difficult. The data can be classified in various ways and stored in different locations according to the classification. For example, the data can be ordered by date of creation or date of last access, and the data having these dates before a threshold date can be migrated from primary storage devices to secondary storage devices. While such data migration frees up space on the primary storage devices, it adds to the workload of the server that is responsible for migrating data and the amount and complexity of the data on the secondary storage devices. In addition, the condition that triggers such data migration can change quickly over time, and applications that encode the trigger logic would need to change accordingly. As the application logic layer provides user interfaces and often involves complex control logic, updating application logic layer can be tedious and time-consuming, adversely affect user experience.

The expanding volume of data also makes finding the desired information more difficult. While users today often expect instantaneous, real-time response from computer systems, it can take a long time for a server to process a query or generate a report against such expanding volume of data, especially when the server already has a heavy workload.

BRIEF DESCRIPTION OF THE DRAWINGS

FIG. 1B is a detailed view of a primary storage device, a secondary storage device, and some examples of primary data and secondary copy data.

FIG. 7 illustrates an example architecture for a system which includes a dedicated reporting server.

DETAILED DESCRIPTION

Figure 1A:
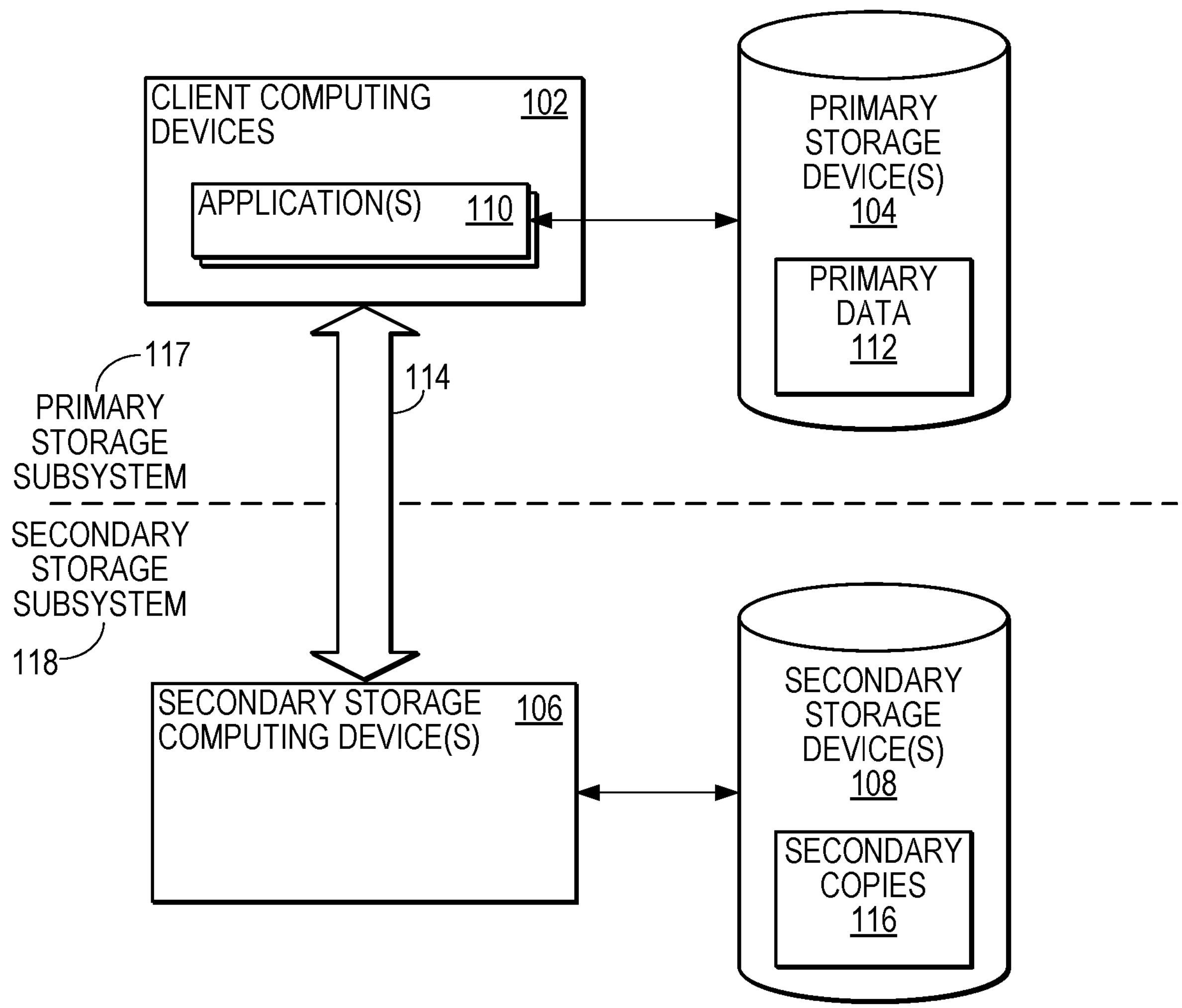
FIG. 1A is a block diagram illustrating an exemplary information management system.

Systems and methods are disclosed for efficiently handling variable queries against a large volume of changing data and predicting the size of the result of processing queries. The systems and methods eliminate the need to update the application logic layer in response to updated data organization. The systems and methods also reduce the possibility of performing inefficient or untimely data migration. In addition, the systems and methods avoids overload of primary servers and user dissatisfaction due to untimely response from the primary servers.

Described in detail below is a first system having a database driver gate for processing database queries from users, where the data is spread over at least two storage locations, such as primary and archive storage locations. A second system includes a size prediction capability to estimate the size of a result of processing a database query. Includes a dedicated reporting server to expedite data searching and processing based on requests for data reports. Examples of these three systems and methods are described in further detail herein, in reference to FIGS. 2-9. Components and functionality of these systems and methods may be configured and/or incorporated into information management systems such as those described herein in FIGS. 1A-1H.

Referring to the first system, the present application discloses a system and related methods to efficiently handle database queries as data organization changes in databases. In some embodiments, a client computing systems includes an application logic layer, a database gate, and a set of database drivers. The database gate is a component that interfaces between an application logic layer, which handles user interfaces, and a set of database drivers, which access database tables. The database gate translates data requests submitted by users to database queries. For example, a user may request all transaction data up to the year of 2008. When data migrates from one database system to another, or one storage location to another—such as when only portions/tables of the overall database are migrated—the database queries need to be updated as necessary.

In one example, all transaction data up to the year of 2008 was stored in the same database system, but is now stored in two separate database systems or storage locations following an archive operation. A user or system now requests access to the whole dataset via a query, and thus needs to separately access both database systems/storage locations. By monitoring such data operations, the database gate updates internal bookkeeping whenever data is moved, including a mapping table (mapping of data or mapping of database data) that indicates where each piece of data is stored, without having to update the user interfaces or the application logic layer after data has been migrated. Upon receiving the user/system request through the application logic layer, the database gate determines how to build database queries from the request based on the mapping table, and communicates the database drivers to execute the database queries and retrieve the data requested by the user/system.

Referring to the second system, the present application discloses a system and related methods for predicting the size of a database query result. In some embodiments, a client computing system includes a predictor module. The predictor module estimates the size of the result of executing a database query. For example, a user may be interested in learning how much data will be moved in archiving all the transaction data up to the year of 2008, in deciding whether and how to carry out the archiving operation. Upon receiving a user request, the predictor module identifies an initial database query corresponding to the user request. Since database tables can be related, as often indicated by foreign keys in database schemas, the change in one database table can affect another database table.

In one example, there may be a customers table and an addresses table, and there may be one record in the customers table and one or more records in the addresses table that are linked to the record in the customers table for a given customer. When a customer record is deleted, all the addresses records linked to that customer record should also be deleted. The predictor module expands the initial database query into a nested database query in accordance with a database schema. Furthermore, the predictor module estimates the number of records that are hits of the nested database query and the length of these records to arrive at an estimated total size of these records. Based on the estimated total size, the user can then determine whether and how to carry out the database operation.

Referring to the third system, the present application discloses a system and related methods for handling database queries through a dedicated reporting server. In some embodiments, the reporting server specializes in executing database queries and generating data reports. The reporting server communicates with one or more storage managers, each of which maintains a management database. The reporting server periodically retrieves or receives copies of management databases managed by the storage managers and builds indices for the copies of data that enable fast searching.

In one example, the reporting server builds a column-based index from the retrieved/received data. The reporting server may select certain tables out of all the tables in the local databases and then build the column-based index for each of the selected tables When a storage manager receives a reporting request from a user, instead of processing the reporting request locally, the storage manager sends the reporting request or a corresponding database query to the reporting server. Similarly, when a web-based console receives a reporting request from a user, instead of sending the reporting request to a storage manager, the web console sends the reporting request to the reporting server. The reporting server then builds a database query as necessary and executes the database query using the prebuilt database indices, such as the column-based index. The reporting server then formats the database query result as necessary and sends the database query result back to the storage manager or the web console, which then reports the query result to the user.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 7,035,880, entitled "Modular Backup and Retrieval System Used in Conjunction With a Storage Area Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,246,207, entitled "System and Method for Dynamically Performing Storage Operations in a Computer Network";
- U.S. Pat. No. 7,747,579, entitled "Metabase for Facilitating Data Classification";
- U.S. Pat. No. 8,229,954, entitled "Managing Copies of Data";
- U.S. Pat. No. 7,617,262, entitled "System and Methods for Monitoring Application Data in a Data Replication System";
- U.S. Pat. No. 7,529,782, entitled "System and Methods for Performing a Snapshot and for Restoring Data";
- U.S. Pat. No. 8,230,195, entitled "System And Method For Performing Auxiliary Storage Operations";
- U.S. Pat. No. 7,315,923, entitled "System And Method For Combining Data Streams In Pipelined Storage Operations In A Storage Network";
- U.S. Pat. No. 8,364,652, entitled "Content-Aligned, Block-Based Deduplication";
- U.S. Pat. Pub. No. 2006/0224846, entitled "System and Method to Support Single Instance Storage Operations";
- U.S. Pat. No. 8,578,120, entitled "Block-Level Single Instancing";
- U.S. Pat. Pub. No. 2009/0319534, entitled "Application-Aware and Remote Single Instance Data Management";
- U.S. Pat. Pub. No. 2012/0150826, entitled "Distributed Deduplicated Storage System";
- U.S. Pat. Pub. No. 2012/0150818, entitled "Client-Side Repository in a Networked Deduplicated Storage System";
- U.S. Pat. No. 8,170,995, entitled "Method and System for Offline Indexing of Content and Classifying Stored Data";
- U.S. Pat. No. 7,107,298, entitled "System And Method For Archiving Objects In An Information Store";
- U.S. Pat. No. 8,230,195, entitled "System And Method For Performing Auxiliary Storage Operations";
- U.S. Pat. No. 8,229,954, entitled "Managing Copies Of Data"; and
- U.S. Pat. No. 8,156,086, entitled "Systems And Methods For Stored Data Verification".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine (s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 1346 represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 1196, and 129A as 133A', 1196', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
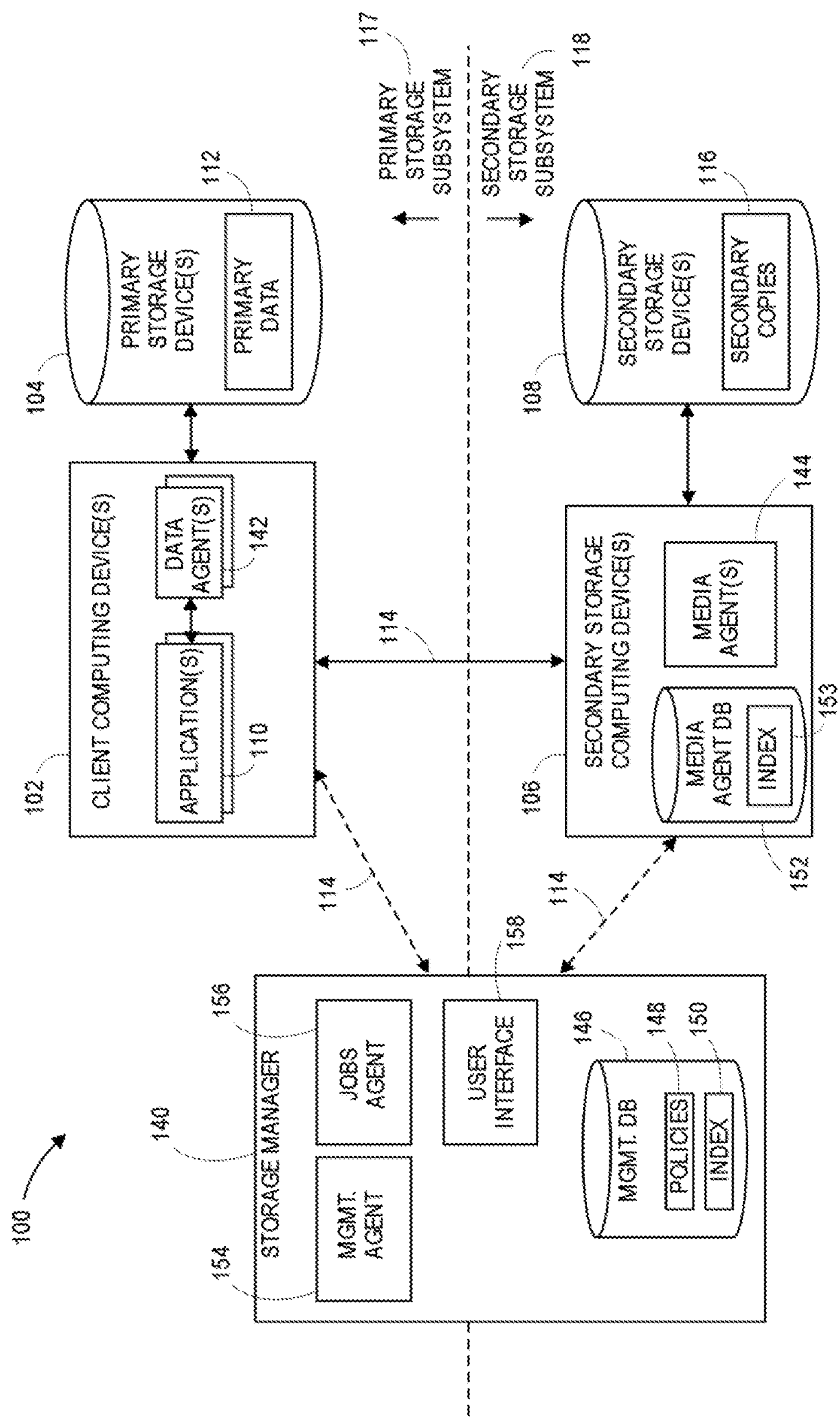
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:

- initiating execution of secondary copy operations;
- managing secondary storage devices 108 and inventory/capacity of the same;
- reporting, searching, and/or classification of data in the information management system 100;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An “information management cell” (or “storage operation cell” or “cell”) may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces (“APIs”) including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to backup the Exchange mailboxes, a Microsoft Exchange Database data agent 142 to backup the Exchange databases, a Microsoft Exchange Public Folder data agent 142 to backup the Exchange Public Folders, and a Microsoft Windows File System data agent 142 to backup the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
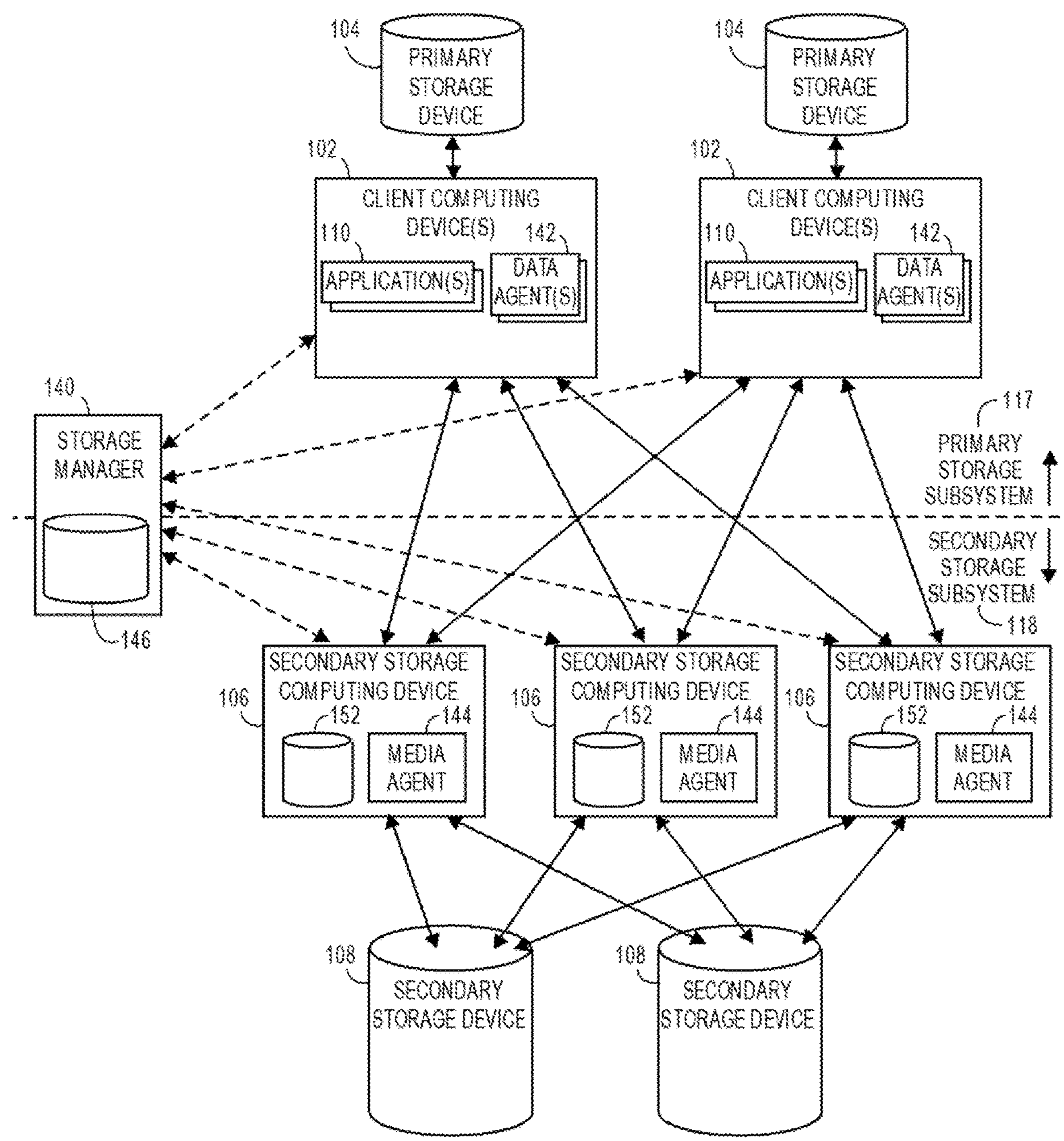
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device (s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application (s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
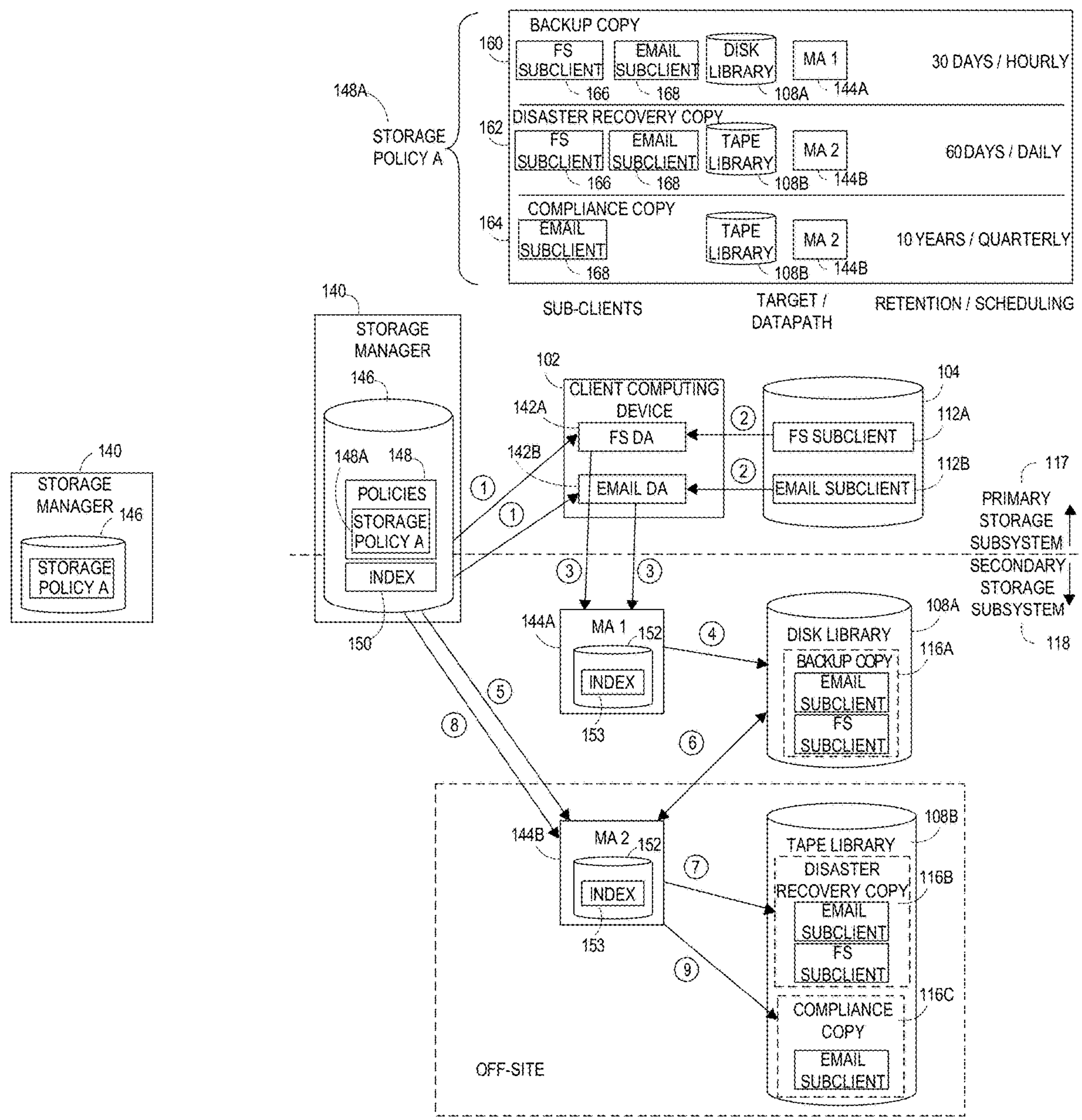
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 1128, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 1128, include data generated by an e-mail application operating on the client computing device 102, and can include mailbox information, folder information, emails, attachments, associated database information, and the like. As described above, the sub-clients can be logical containers, and the data included in the corresponding primary data 112A, 1128 may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 1168 according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 1448 uses the retrieved data to create a disaster recovery copy 1168 on the tape library 1088. In some cases, the disaster recovery copy 1168 is a direct, mirror copy of the backup copy 116A, and remains in the backup format. In other embodiments, the disaster recovery copy 1168 may be generated in some other manner, such as by using the primary data 112A, 1128 from the primary storage device 104 as source data. The disaster recovery copy operation is initiated once a day and the disaster recovery copies 1168 are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 1448 to create the compliance copy 116C on the tape library 108B at step 9, as specified in the compliance copy rule set 164. In the example, the compliance copy 116C is generated using the disaster recovery copy 1168. In other embodiments, the compliance copy 116C is instead generated using either the primary data 1128 corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 1168, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
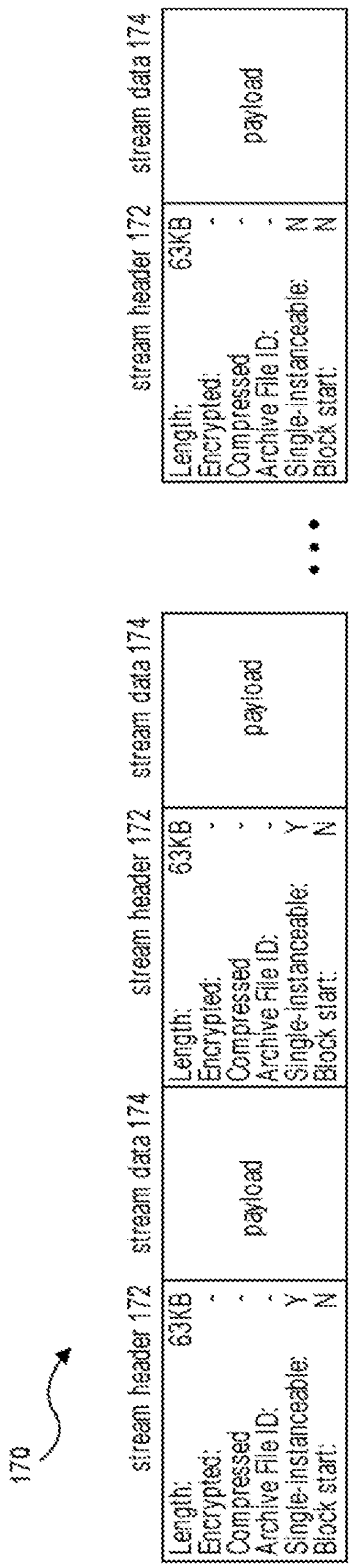
FIGS. 1F-1H are block diagrams illustrating suitable data structures that may be employed by the information management system.
Figure 1G:
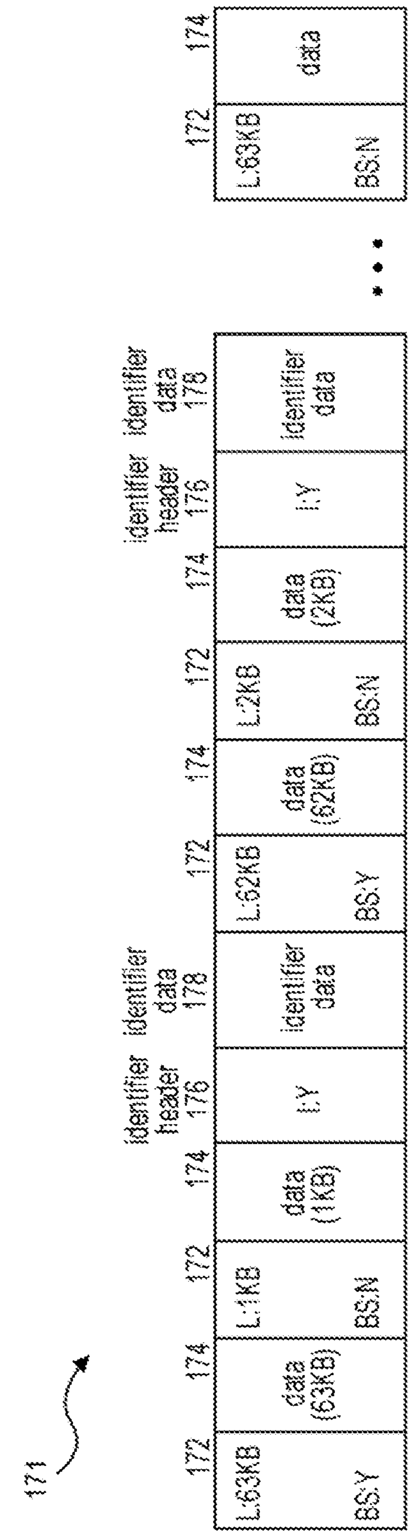

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
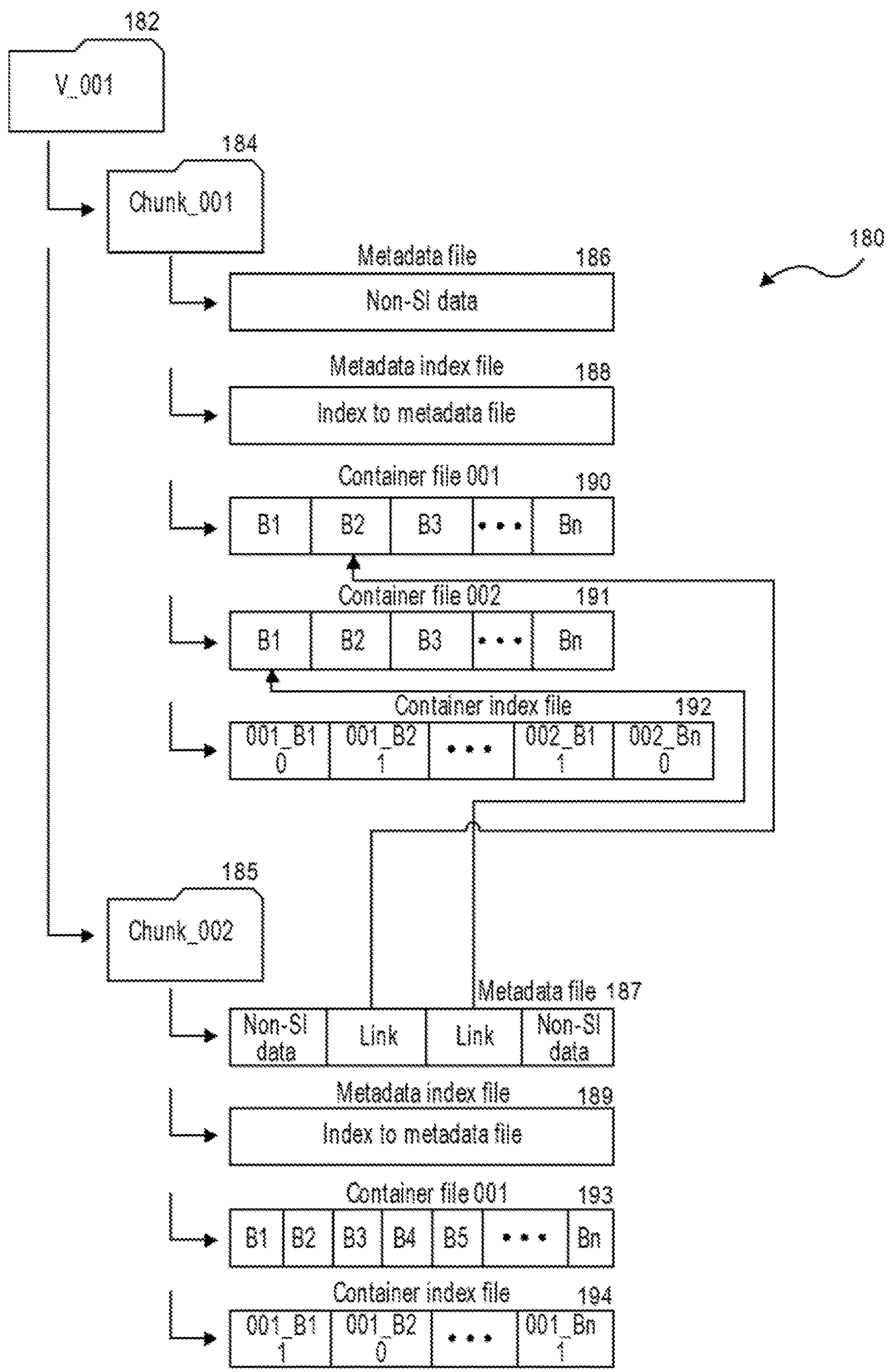

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Database Driver for Database Mapping

Figure 2:
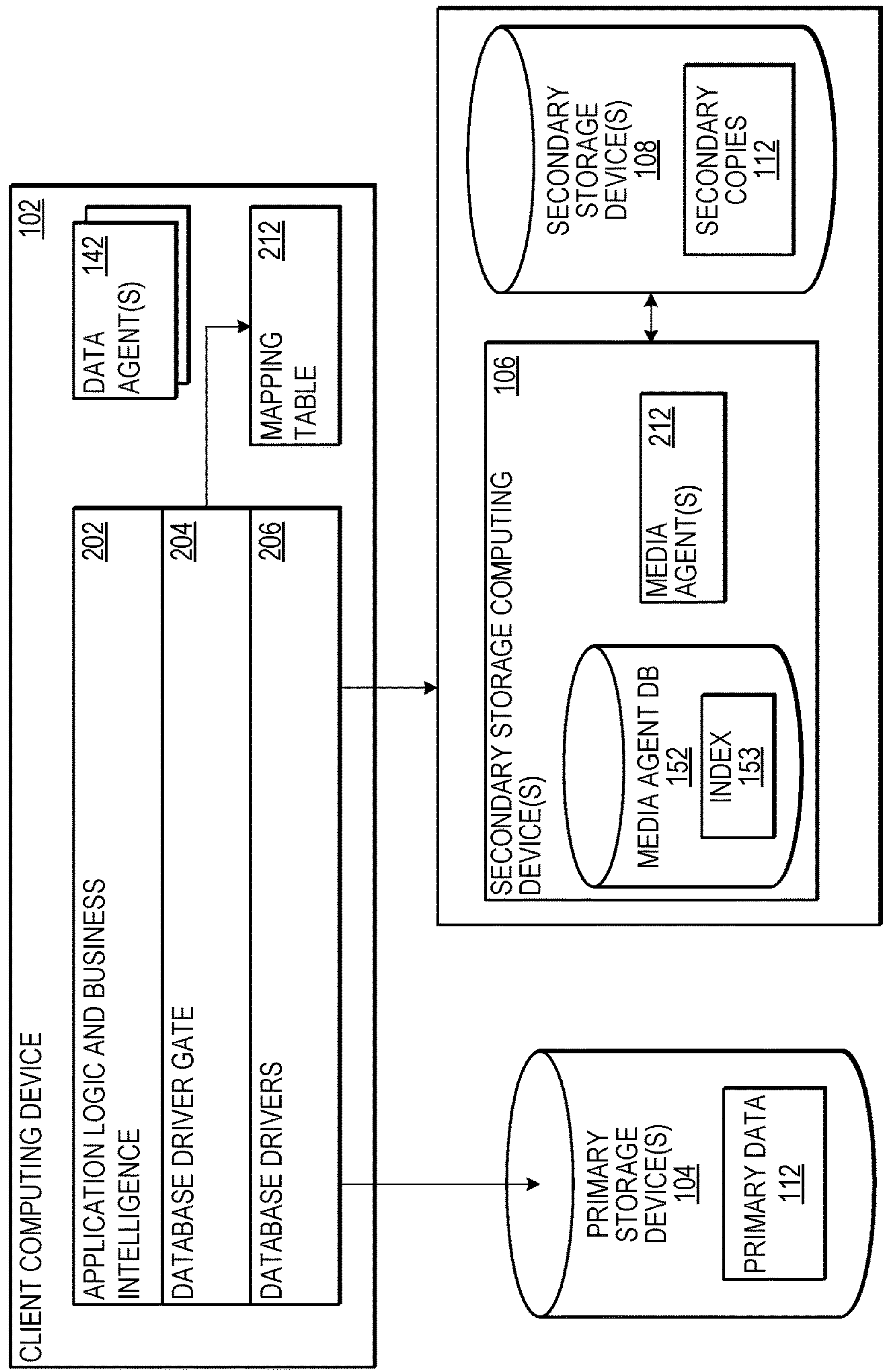
FIG. 2 illustrates an example architecture for a system that includes a database mapping capability.

A first system described in detail below efficiently handles queries against a large volume of changing data, often stored in two different locations, by introducing a database mapping capability. FIG. 2 illustrates an example architecture for the system that includes the database mapping capability. A client computing device 102 here includes a database driver gate (database gate component) 204 that interfaces with an application logic layer (application logic and business intelligence layer, application logic component, or application component) 202 and a set of database drivers 206. In other embodiments, some or all components such as the application logic layer 202, database drivers 206 and/or database driver gate 204 may be located within other system components, such as in the storage manager, and the client computing device works with the storage manager to implement the functionality discussed below. The set of database drivers 206 can be, for example Open Database Connectivity (ODBC), Java Database Conductivity (JDBC), etc. Originally, the application logic layer 202 would handle interaction with users as well as the database drivers. The application logic layer 202 would accept a request for data from a user via a user interface, and process the data request by invoking one or more of the database drivers 206. The application logic layer 202 tends to be complex due to the need to incorporate different types of logic regarding the user interfaces, workflows, various executables, and so on. Therefore, it generally takes a considerable amount of effort to ensure proper operation of the application logic layer 202 in response to any internal change.

In some embodiments, the application logic layer 202 now communicates with the database driver gate 204 instead of directly with the database drivers 206, thus providing a new way to connect to databases, particularly when a data query requires data to be accessed in two or more databases (production database, archive database, etc.) located in different data storage targets, such as within primary storage (production system or production data storage system) and secondary storage (archive system or archive data storage system). If there is any change in data organization and structure in the storage devices, the application logic layer 202 no longer needs to be updated because the database driver gate 204 may encapsulate details related to such a change and properly handle the change in interacting with the database drivers 206. For example, if data is moved from primary storage to secondary storage, then the present embodiment tracks such change in a table or data structure, without needing to make any modifications to the application logic layer 202.

In some embodiments, the database driver gate 204 maintains a mapping table 212 that indicates in which database systems particular data is located, where access to each database system is typically separate. For example, the mapping table 212 can specify that all data related to transactions conducted after a certain year is stored in primary storage devices 104, while all data related to transactions conducted up to the certain year is stored in secondary storage devices 108. It will be appreciated by someone of ordinary skill in the art that the data can be classified and stored in any desirable way, based on the content, the time of creation, the time of last access, the size, etc. In general, the database driver gate 204 monitors data migration activities, by working with a storage manager 140 (not shown in FIG. 2), or with a data agent 142 that is also included in the client device 102, and updates the mapping table 212 to reflect any change in data storage locations. In addition to data moves across database systems, the database driver gate 204 can monitor various changes in data organization and structure, such as data splits and merges.

Thus, the mapping table 212 is a database of metadata (or "database") such as a split table, and is generated by a filter residing in the database driver gate 204 (or forming a part of the database drivers 206). The mapping table 212 is used by the database driver gate 204 in monitoring data movement. This mapping table or index thus identifies what data is stored where based on what rule. Often data may be removed or migrated from primary storage devices 104 to secondary storage devices 108, and thus the present system monitors such data migration and "logs" it in the mapping table 212. While the present description generally discusses data being split between primary storage devices 104 and secondary storage devices 108, data may be split among multiple storage targets, such as two or more secondary storage devices 108.

Figure 3:
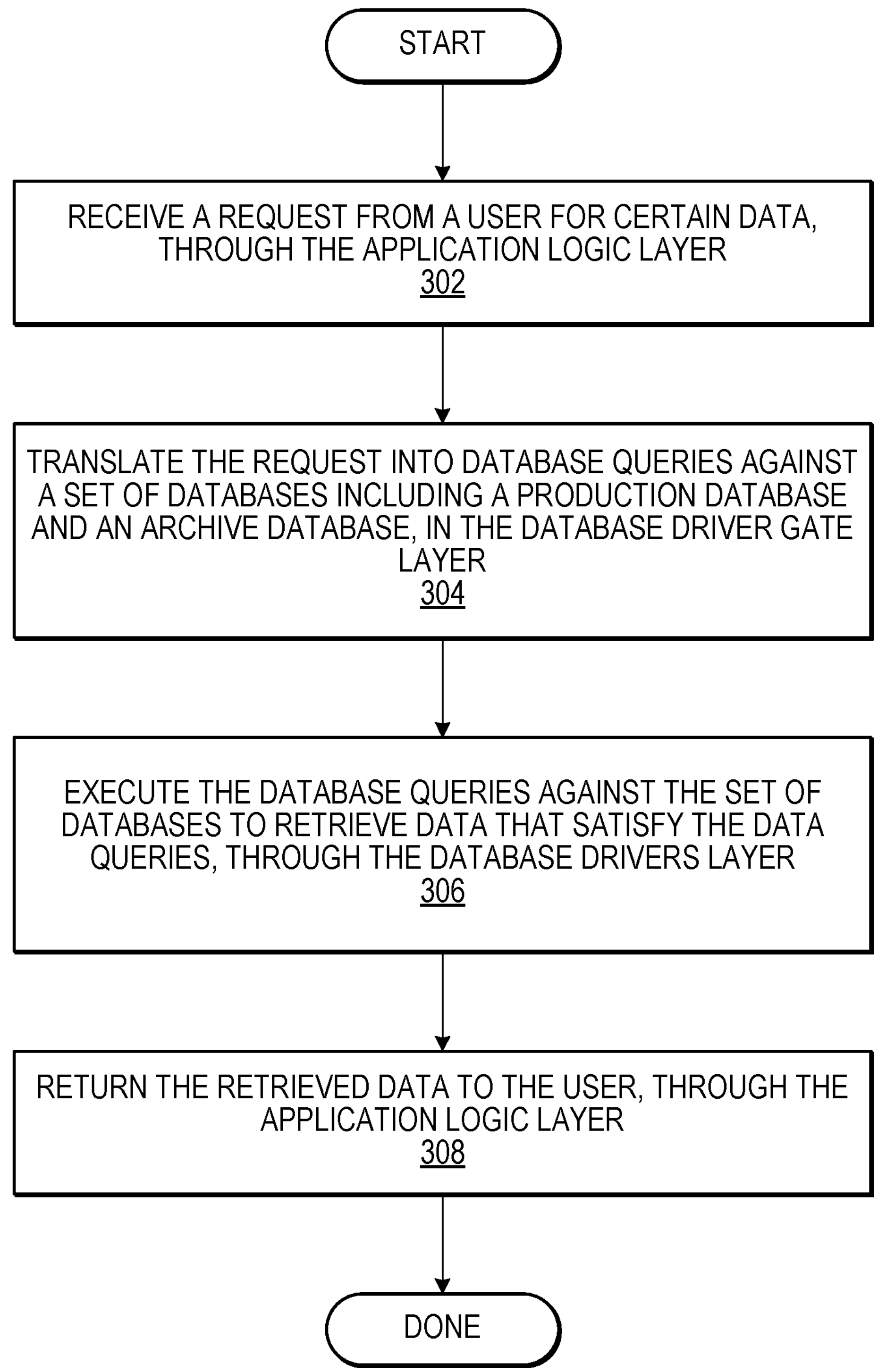
FIG. 3 depicts some salient operations of a method performed by a database driver gate in the system of FIG. 2, for processing a data request from a user regarding data spread over multiple database systems.

FIG. 3 depicts some salient operations of a method performed by the database driver gate of processing a data request from a user regarding data spread over multiple database systems according to an illustrative embodiment. The application logic layer initially accepts a user request for certain data. For example, the application logic layer can manage a GUI that allows a user to choose from a list of predetermined types of requests. One example request is listing all transactions of the user that occurred up to the year 2008.

In step 302, the database driver gate receives the user request or query through the application logic layer (the terms "user request" and "query" and generally used interchangeably herein). In step 304, for each predetermined type of request, the database driver gate determines which storage or database systems to access and translates the data request into two or more database queries against the database systems, such as a primary (production) storage system and a secondary (archive) storage system. The database queries may generally be the same, but simply directed to two or more different database systems.

In some embodiments, the mapping table can have the following entries:

| Data | Year | Database System |
|---|---|---|
| Transaction | 2005 | Archive |
| Transaction | 2006 | Archive |
| Transaction | 2007 | Production |
| Transaction | 2008 | Production |

When the type of data request is for a list of all "transactions" of the user that occurred up to a certain "year", 2008 in this case, the database driver gate translates the data request to database queries keyed on a "year" attribute" against a "transaction" table. From the mapping table, the database driver gate further determines that it needs to submit one query (archive database query) to the databases on an archive storage system for transactions that occurred in 2005 and 2006 and one query (production database query) to the databases on a production storage system for transactions that occurred in 2007 and 2008. (While not shown, the Database System table can include logical locations of the appropriate corresponding database systems and any other data needed to allow the system to automatically connect to or access such database systems.)

In step 306, the database driver gate runs these queries against the appropriate databases by invoking the appropriate database drivers for the corresponding data storage systems. After running multiple queries, the database driver gate receives responses to those queries (including an archive query result and a production query result), and can assemble the multiple query results according to predetermined rules. In step 308, the database driver gate returns the assembled or combined results (combined query results) to the user through the application logic layer. For other types of data requests, the mapping table can contain data in other formats to enable the database driver gate to determine where desirable data is located.

In this manner, regardless how the data moves among database systems or otherwise changes in a way that affects query execution, no change needs to be made to the application logic layer, and efforts required to maintain the application logic layer in response to such changes can be eliminated. Instead, the handling of such changes is isolated to the database driver gate, which facilities the debugging and implementation of such handling.

Archive Size Predictor

Figure 4:
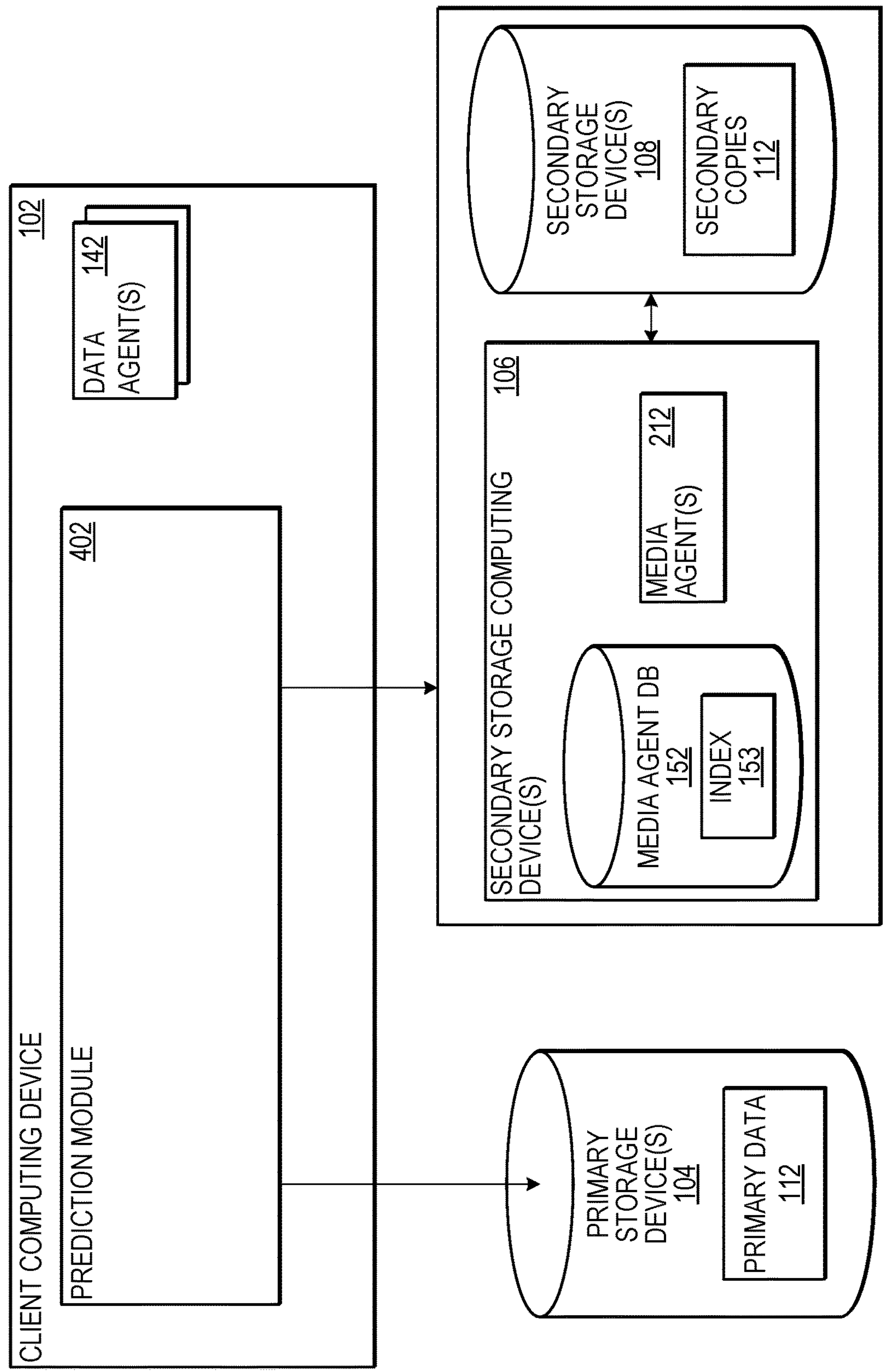
FIG. 4 illustrates an example architecture for a system that includes a size prediction capability.

A second system described in detail below predicts the size of data that would result when executing a database query, such as a database query for certain data to be archived, migrated, moved, copied or backed up. FIG. 4 illustrates an example architecture for the system that includes the size prediction capability. A client computing device 102 here includes a prediction module 402, though in other embodiments the prediction module may be located in other system components, such as within the storage manager 140, and the client computing device interacts with the storage manager to provide data size prediction discussed below. In some embodiments, the prediction module 402 receives a user request to perform a database or other operation, and the prediction module 402 estimates the size of the data affected by the operation.

Figure 5:
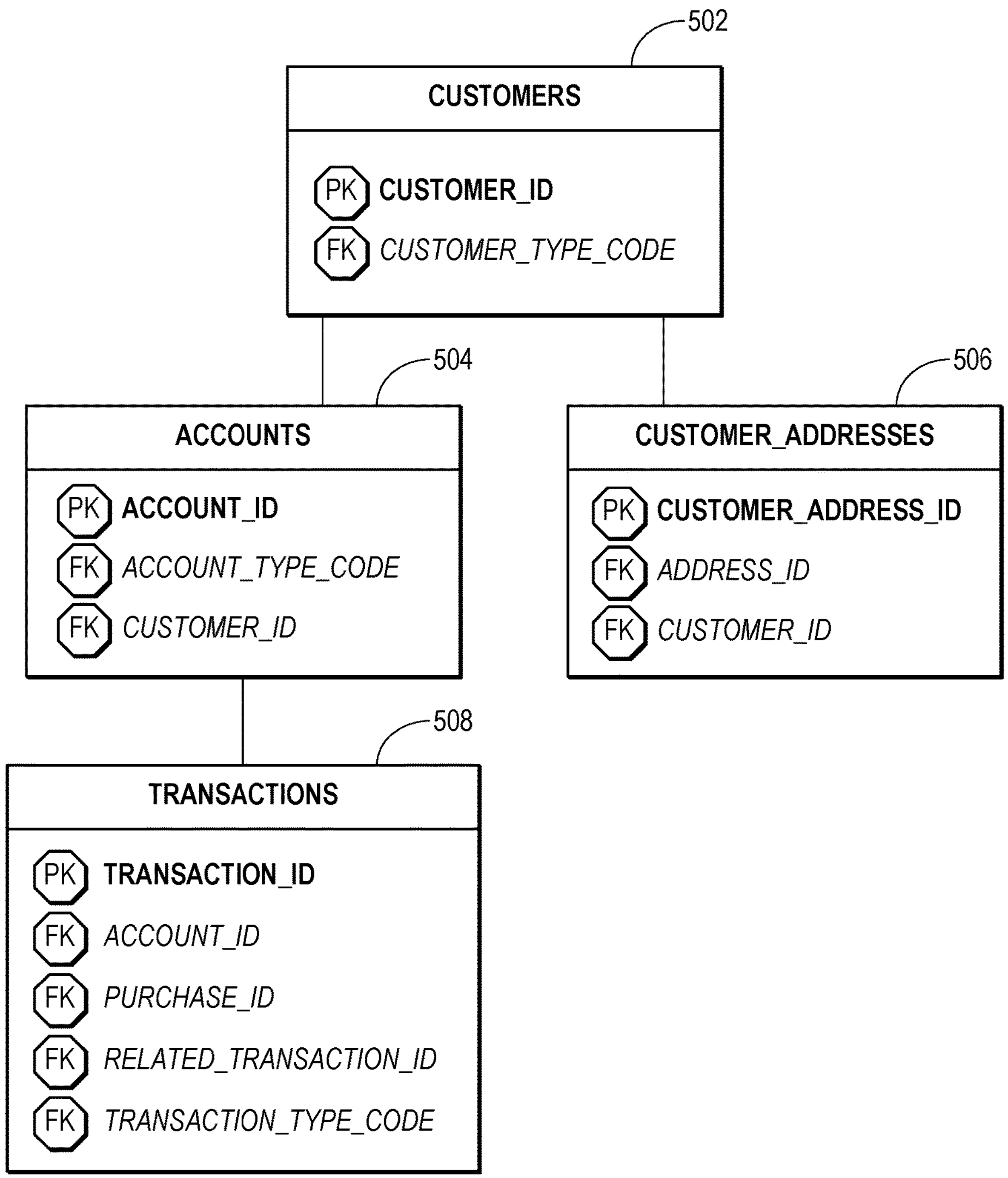
FIG. 5 illustrates an example database schema for the system of FIG. 4.

FIG. 5 illustrates an example database schema, which helps explain how the prediction module 402 works. According to this database schema, a database includes a customers table 502, an accounts table 504, a customer addresses table 506, and a transactions table 508. Conceptually, a customer can have one or more accounts and one or more addresses, and each account typically has multiple transactions. A user, such as a database administrator, can make, e.g. an archive request, which typically takes the form of moving all the data that satisfies one or more criteria from primary storage to secondary storage. Some example criteria include data related to transactions having a purchase amount of less than $5,000 or a transaction date of 2008 or earlier. The archive request would entail moving all records in the transactions table 508 that satisfy the criteria. Depending on database policies, the archive request can further result in the move of a record in the accounts table 504 when all the transaction records linked to the account record are moved, or the move of a record in the customers table 502 when all the account records linked to the customer record are moved, which can trigger the move of the records in the customer addresses table 506. Therefore, an initial request to move some records can cause a cascade of changes in the database since linked or associated records must also be moved. By estimating the total size of the data affected by the request, the prediction module 402 facilitates determining the scope of the request and an approach for responding to the request. Such a size prediction can help the system determine an amount of secondary storage to allocate, and even whether a secondary storage target has sufficient available storage to handle the data move.

Figure 6:
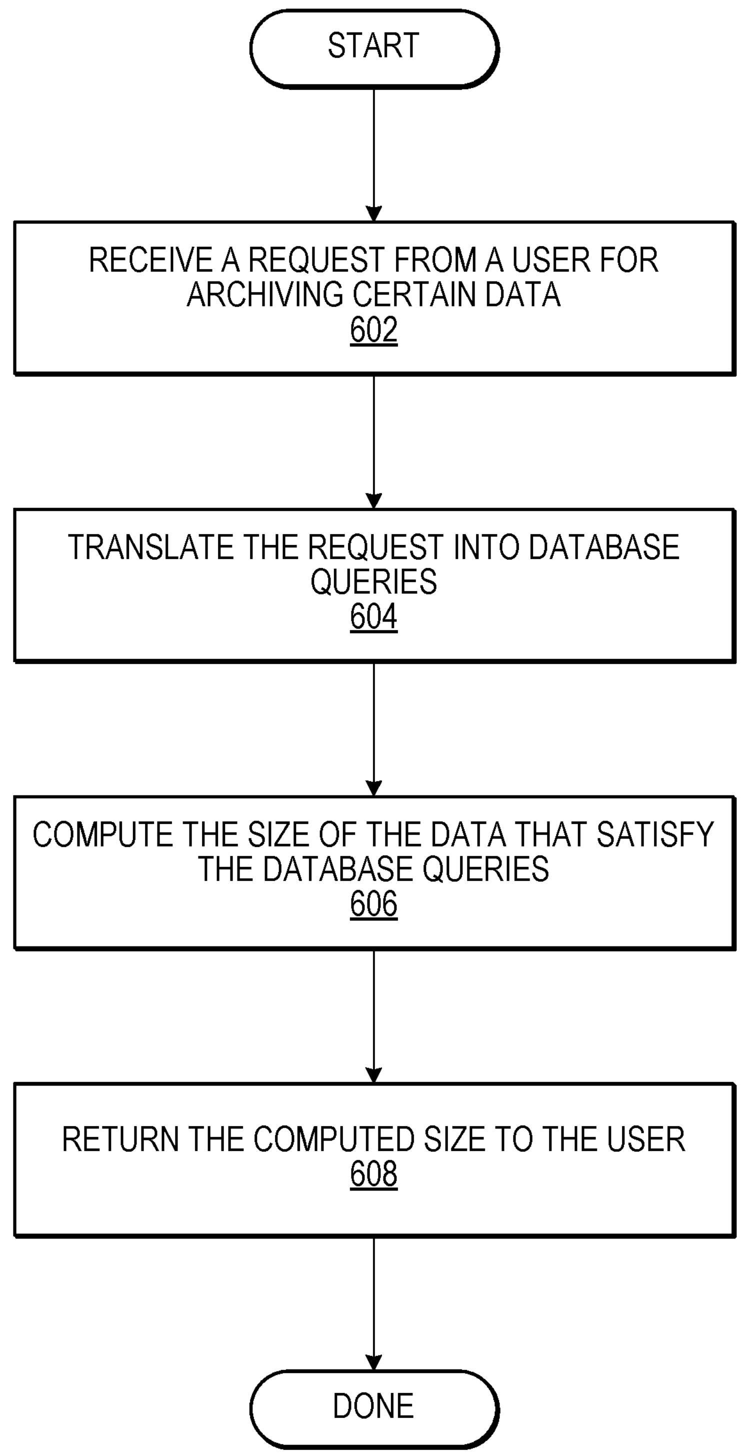
FIG. 6 depicts some salient operations of a method performed by a prediction module of the system of FIG. 4, for estimating a size of a result of processing a database query.

FIG. 6 depicts some salient operations of a method performed by the prediction module of estimating a size of a result of executing a database query. In some embodiments, in step 602, the prediction module receives a request from a user for archiving certain data. An archive operation typically involves moving data from primary storage to secondary storage. Specifically, database archiving includes the process by which inactive data is moved out of active database tables in primary storage, thus freeing up storage space in primary storage that can be used to store more data and help query performance. Moving data requires a certain amount of effort to effect the move and synchronize data and operations after the move, but has the main advantage of freeing up space on the primary storage. Therefore, an archive request poses a tradeoff to be evaluated.

In step 604, the prediction module translates the user request to one or more database queries. Using the example presented in FIG. 5, for a user request of archiving all the data related to transactions having a transaction date of 2008 or earlier, the prediction module first identifies the transactions table in the database. To facilitate such identification, the prediction module can manage or interact with a GUI that allows a user to choose a predetermined type of request. For example the GUI can allow a user to specify a first criterion of all transactions having a purchase amount of less than $5,000 and a second criterion of all customers living in a certain town. The prediction module can then map the first criterion to a database query of the transactions table and the second criterion to a database query of the customers and customer addresses tables.

In step 606, the prediction module builds a full database query for all data that should be moved as a result of the user request, based on the database schemas and rules. As discussed above, the prediction module can traverse the database table hierarchy in accordance with existing policies. Using the example presented in FIG. 5, after determining which records in the transactions table should be moved, the prediction module can move up the hierarchy, such as by following foreign keys in the transactions table, to determine which records in the accounts and customers tables should be moved. The prediction module can then move down the hierarchy, such as by identifying tables that have foreign keys pointing to the customers table, to determine which records in the customer addresses table should be moved.

After building the full database query, the prediction module estimates the size of the query result. For example, the prediction module can identify the number of rows from the query, determine an average row length, and then multiply the average row length by number of rows to predict the total size of data to be involved in the data move. Generally, the prediction module can execute a count function corresponding to the full database query to estimate the number of records that would be returned from executing the database query (e.g. using SELECT (*) function in SQL). For each of these records, the prediction module can find an approximate size from the database schemas. The prediction module can then compute an average size of the sizes of the records from different tables and multiply that by the result of the count function to obtain an estimate of the total size of data affected by the archive request. Alternatively, as the prediction module builds up the full database query, it can get a count of the affected records in each table and multiply that by the length of each record to obtain a more accurate estimate of the total size of data affected by the archive request.

In step 608, the prediction module returns the final estimate to the user. The final estimate can simply be a number, or alternatively/additionally, the system can return a graphic, such as a bar graph, that shows amount of data storage saved on the primary storage by implementing the data move. Based on this final estimate, the user, the prediction module, or another module on the client computing device can further determine whether and how to satisfy the archive request. In evaluating the aforementioned tradeoff, various factors can be taken into consideration, such as the amount of space left on the primary storage and the secondary storage, the workload of the server that is responsible for performing the archive operation, the need of users to access the data affected by the archive consideration, and so on. Additional archive requests with different parameters can be submitted to determine an optimal archive approach.

In this manner, instead of carrying out an expensive database operation without achieving anticipated benefits, research is conducted, in terms of the size of affected data and other factors, to implement an optimal approach for performing the database operation.

Dedicated Server for Increased Enterprise Reporting Performance

A third system described in detail below efficiently handles queries against a large volume of data by introducing a dedicated reporting server. FIG. 7 illustrates an example architecture for this system that includes the dedicated reporting server. In some embodiments, the reporting server 760 can comprise one or more interconnected processors and databases 762. The reporting server 760 communicates with one or more storage managers 140*a-c* over one or more networks or other connection types, as discussed above. The reporting server 760 can communicate with the different storage managers in a serial manner through a single connection or in a distributed manner through multiple connections. The reporting server 760 receives copies of management databases 146*a-c* from the storage managers 140*a-c* (either continuously or in batches) and stores them in the local databases 762. Furthermore, the reporting server 760 maintains one or more indices 770 separately or together with the local databases 762 to enable fast searching of the local databases 762 as described herein. The indices 770 may be used for handling searches that would otherwise be executed against the "live" management databases 146 associated with respective storage managers 140, which are responsible for managing respective information management systems and are effectively part of the "live" production environment. Rather than taxing a storage manager 140 with responding to queries against its management database 146, the reporting server 760 not only can respond to queries against off-line copies 762 of management databases 146, but also generates indices 770 for speedier query responses. The reporting server 760 may further be able to consolidate queries and/or responses against a multitude of management database copies 762 locally stored by the reporting server 760.

In some embodiments, both of the storage managers 140*a-c* and the reporting server 760 can initiate a data transfer of a management database from the storage manager to the reporting server 760. Each data transfer can be implemented via any copying technique known to someone of ordinary skill in the art. The data can be transferred on a regular basis or at specific times. Each data transfer can be full or incremental compared to previous data transfers. The data can be transferred into a designated area on the reporting server 760, including a temporary location outside the local databases 762. For example, data management or backup software may include a user interface to allow a user to specify a logical location or data path to which relevant metadata is to be backed up, such as in settings of a disaster recovery backup GUI.

The reporting server 760 incorporates the data in each data transfer into the local databases 762 as necessary. For example, the reporting server 760 can periodically check for data transfers at the logical location or data path previously specified. The reporting server 760 can choose to completely overwrite or incrementally enhance the data in the local databases 762 from previous data transfers. Data transfers from different storage managers 140*a-c* can be stored in the same or different portions of the local databases 762 based on specific mappings. The reporting server 760 can update the local databases 762 regularly or according to specific schedules, such as following each data transfer.

Figure 8:
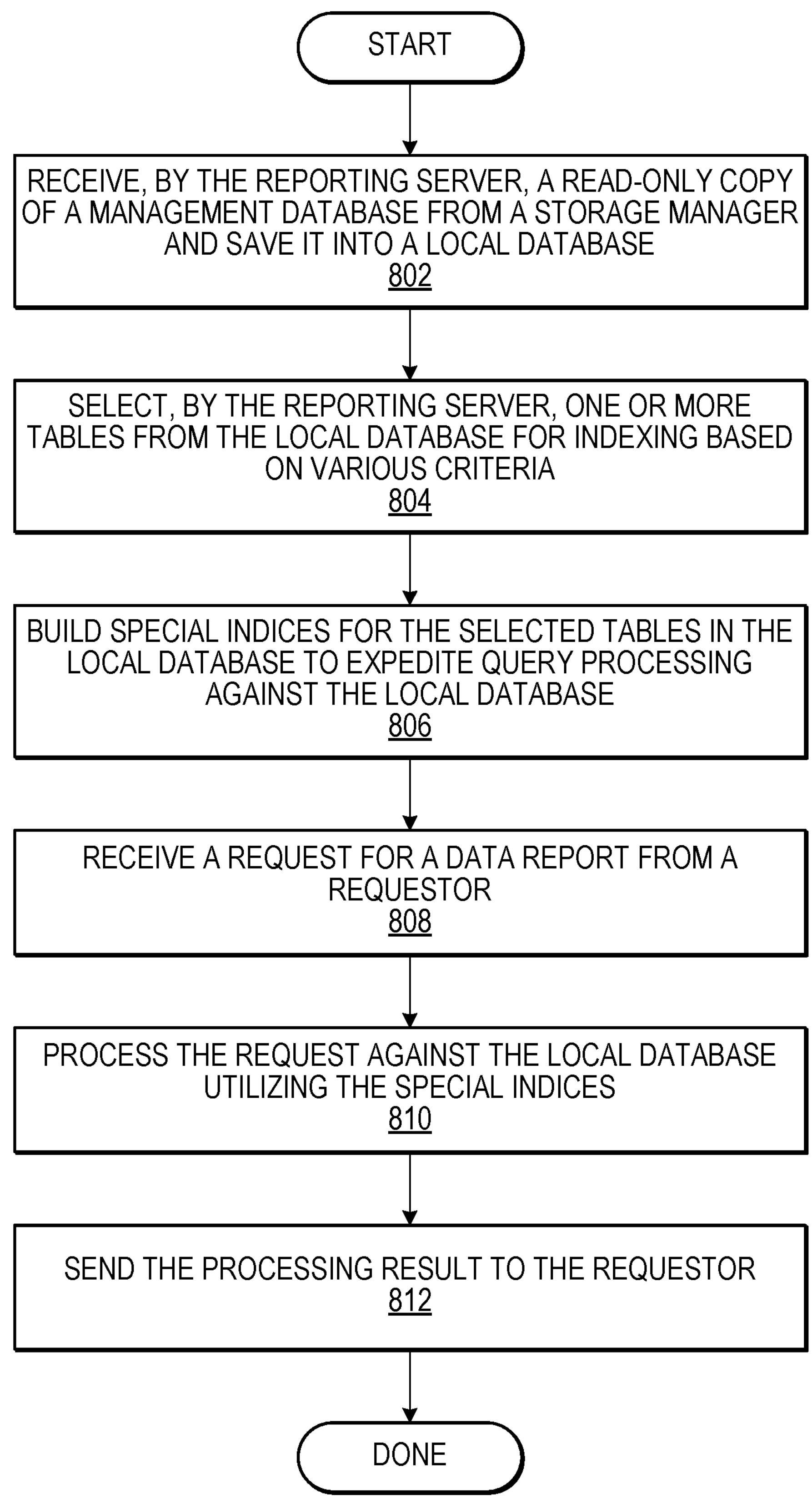
FIG. 8 depicts some salient operations of a method performed by the reporting server of FIG. 7 for setting up a special mechanism to expedite data searching and processing requests.

FIG. 8 depicts some salient operations of a method performed by the reporting server 760 for setting up a special mechanism to expedite data searching and processing requests according to an illustrative embodiment. In step 802, the reporting server 760 receives read-only copies of management databases from the storage managers and saves them into one or more local databases. By operating on offline copies of what are otherwise live management databases 146, the reporting server 760 does not affect ongoing operations of the information management systems and storage managers 140. In step 804, the reporting server 760 selects tables for which to build indices to increase performance of query processing against the local databases. There can be a large number of tables in the local databases 762, which are used in different ways and to various extents. Instead of creating an index for every single table, the reporting server 760 can build indices for select tables according to specific criteria, such as those tables that are the largest or used most frequently. The reporting server 760 can determine which tables satisfy the specific criteria by analyzing submitted queries against the management databases, referencing database metadata and usage statistics, etc. As one example, when a first table that reports job information on a per-job basis is referenced in many submitted queries within a specific timeframe, the first table can be a candidate for indexing. As another example, when a large percentage of rows in a second table that reports job information on a per-attempted-job basis are accessed within a specific timeframe, the second table can also be a candidate for indexing. The reporting server 760 can re-determine the tables that satisfy the specific criteria from time to time and build new indices or drop old indices as appropriate. The specific criteria can also be updated over time. In addition, depending on the indexing techniques used, the reporting server 760 can elect to index only select portions of the table, such as specific columns or specific rows, instead of the entire table.

In step 806, the reporting server 760 builds or updates indices for the any selected tables in the local databases 762. The reporting server 760 can adopt any combination of techniques known to someone of ordinary skill in the art in building the indices. One example technique is the xVelocity in-memory technology of SQL Server 2012 (running on the reporting server 760), which creates a column store and automatically picks the most optimized index (e.g. using ColumnStore Indexes, which is used to index information by columns rather than by rows). As such, very large amounts of data can be accessed quickly and aggregated. The indices can similarly be generated regularly or according to specific schedules, such as following each local database update, following a certain amount of change in each of or all the local databases, or outside normal business hours. Notably, generating such indices is not being performed by other components in the system, such as the storage managers 140*a-c* or secondary storage computing devices 106*a-c*.

In step 808, the reporting server 760 receives a request from one of the storage managers 140*a-c* (or other computing device) for a data report. The reporting server 760 can also receive the request from a standalone console, such as a web-based console, that receives such requests from users. The request can include the original user request, in which case the reporting server 760 converts the original user request into a database query, or a database query converted from an original user request by the storage manager or the standalone console. The request can include an indication of whether a search is to be performed against only data received from one or more particular storage managers or all the data locally available to the reporting server. To ensure a (near) real-time response to such requests to users' satisfaction, the reporting server 760 avoids queuing up such requests and instead can handle them in a distributed manner.

In step 810, the reporting server 760 processes the received request against one or more of the local databases 762 utilizing the indices 770 already built for the local databases. The reporting server 760 can process the request against all the local databases or some of the local databases depending on the identity of the storage manager, the nature of the request, or other factors. The reporting server can detect the presence of common requests and store the processing results in response to these common requests. While the indices 770 typically lead to a high data processing speed, the reporting server 760 can further shorten the response time by accessing previously generated reports instead of generating them on the fly. The reporting server can shorten the response time even more by enhancing or adjusting the indices 770 for specific incoming requests. The reporting server 760 then formats the appropriate data processing result as necessary and generates a report for delivery. In step 812, the reporting server sends the report back to the storage manager or the console in response to the request.

Figure 9:
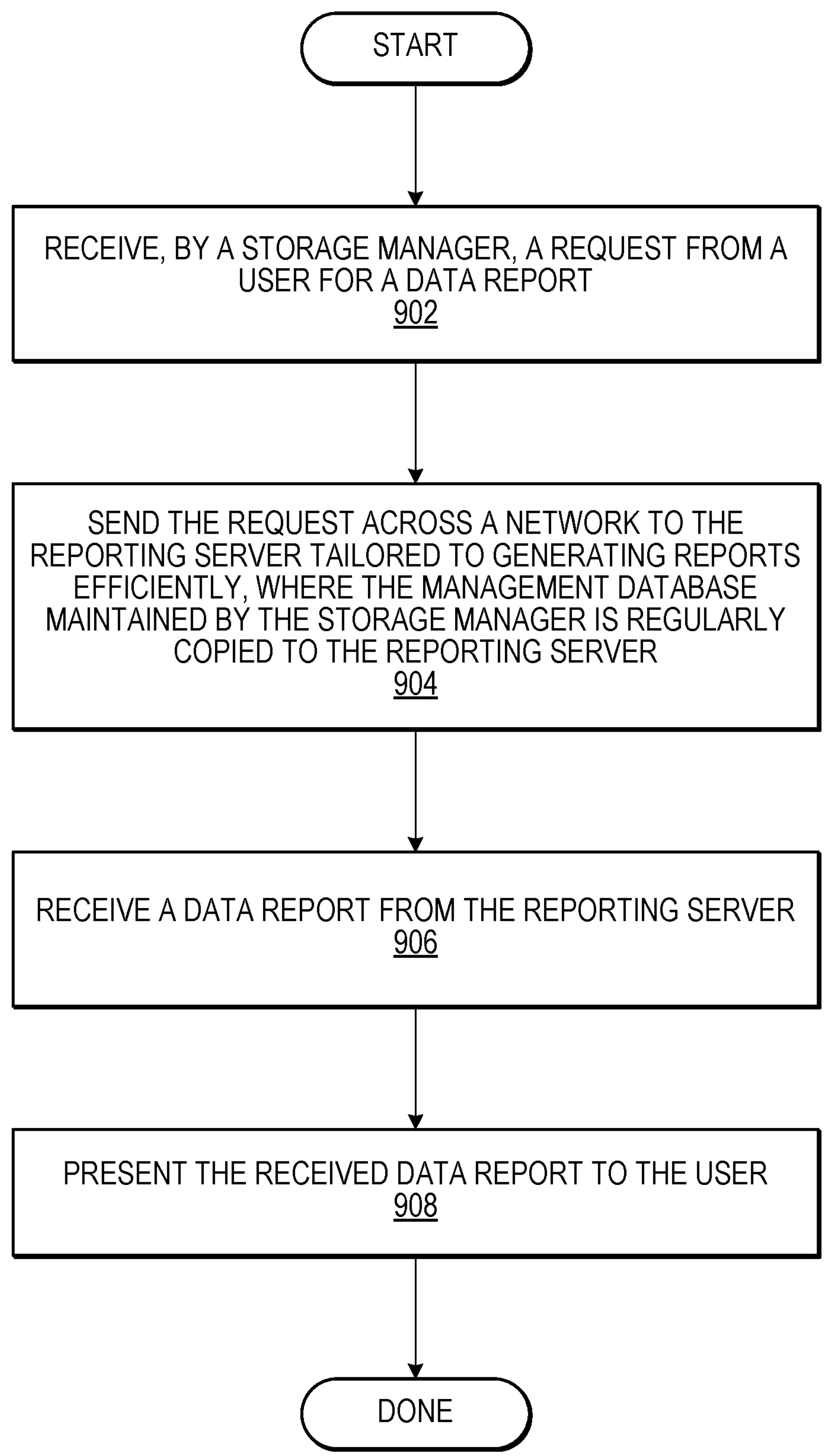
FIG. 9 depicts some salient operations of a method performed by a storage manager of the system of FIG. 7, for responding to requests for data reports.

FIG. 9 depicts some salient operations of a method performed by one of the storage managers 140*a-c* for responding to requests for data reports according to an illustrative embodiment. The method can also be performed by the standalone console. With the reporting server 760 up and running, upon receiving a query in step 902 from a user for data in the management database 146 maintained by the storage manager, the storage manager no longer processes the query locally. Instead, in step 904, the storage manager sends the query to the reporting server 760, which manages copies of management databases maintained by the storage managers in the local databases 762. The reporting server 760 quickly executes the query against the local databases 762 using the prebuilt indices 770 and generates a report of the query result. Subsequently, in step 906, the storage manager receives the report from the reporting server 760. In step 908, the storage manager displays the report to the user, thereby satisfying the user's request.

Under the above system, the reporting server 760 takes over data searching and reporting tasks from each of the storage managers 140*a-c*, enabling the storage manager to better handle other tasks. The reporting server 760 provides a user with requested data and reports with short turnarounds while allowing a user to query against all the management databases 146*a-c* at once, resulting in increased user satisfaction.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A reporting system comprising:

one or more processors; and one or more non-transitory, computer-readable memory storing computer-executable instructions that, when executed by the one or more processors, configure the system to perform a plurality of operations comprising:

receiving, from one or more storage managers, a first copy of live management database data associated with its corresponding storage manager, wherein each of the one or more storage managers is associated with a corresponding management database that stores the corresponding first copy of live management database data;

storing the first copy of the live management database data as an offline copy of management database data into one or more local databases of a reporting server;

prior to a data reporting request, building one or more indices for the one or more local databases based on selected one or more tables from the one or more local databases according to one or more criteria, wherein:

each table of the selected one or more tables satisfies the one or more criteria, and, a first criterion of the one or more criteria is based on a relative characteristic for a corresponding table of the selected one or more tables, wherein the relative characteristic is based on a specific timeframe of usage for the corresponding table;

receiving, by the reporting server, the data reporting request for a report of metadata associated with the one or more storage managers, wherein the data reporting request includes an indication of whether a search corresponding to the data reporting request is to be performed against a particular subset of the one or more local databases of the reporting server or all the local databases of the reporting server;

producing, by the reporting server, a report based on processing the data reporting request using the one or more indices, wherein the one or more local databases is searched based on the indication included within the data reporting request;

updating the one or more indices based on the one or more criteria, wherein updating comprises removing at least one index from the one or more indices where at least one table corresponding to the at least one index fails to satisfy at least one criterion from the one or more criteria; and sending, by the reporting server, the data report to a requesting user.

2. The reporting system of claim 1, wherein the plurality of operations further comprises:

selecting one or more tables from the one or more local databases for indexing based on the one or more tables satisfying one or more criteria selected from the group comprising:

the one or more tables being a largest table in the one or more local databases; and the one or more tables being most frequently used within the one or more local databases.

3. The reporting system of claim 1, wherein the plurality of operations further comprises:

determining whether a temporary location different from the one or more local databases includes the first copy of the live management database data; and wherein:

storing the first copy of the live management database data as the offline copy of management database data is based on a determination that the temporary location includes the first copy of the live management database data.

4. The reporting system of claim 1, wherein the updating occurs according to at least one of:

a regular schedule;

a local database update; and based on a certain amount of data having been changed in the one or more tables of the one or more local databases.

5. The reporting system of claim 1, wherein the plurality of operations further comprises:

removing, by the reporting server, the one or more indices based on analyzing queries submitted against the one or more management databases of the one or more storage managers.

6. The reporting system of claim 1, wherein the plurality of operations further comprises:

storing a second copy of live management data at a temporary location different from the one or more local databases of the reporting server; and selectively incorporating the second copy of live management data stored at the temporary location into the one or more local databases by overwriting the data stored in the one or more local databases of the reporting server with the second copy of live management data.

7. The reporting system of claim 1, wherein the plurality of operations further comprises:

storing a second copy of live management data at a temporary location different from the one or more local databases of the reporting server; and selectively incorporating the second copy of live management data stored at the temporary location into the one or more local databases by updating the data stored in the one or more local databases of the reporting server based on the second copy of live management data.

8. A method comprising:

receiving, from one or more storage managers, a first copy of live management database data associated with its corresponding storage manager, wherein each of the one or more storage managers is associated with a corresponding management database that stores the corresponding first copy of live management database data;

storing the first copy of the live management database data as an offline copy of management database data into one or more local databases of a reporting server;

prior to a data reporting request, building one or more indices for the one or more local databases based on selected one or more tables from the one or more local databases according to one or more criteria, wherein:

each table of the selected one or more tables satisfies the one or more criteria, and, a first criterion of the one or more criteria is based on a relative characteristic for a corresponding table of the selected one or more tables, wherein the relative characteristic is based on a specific timeframe of usage for the corresponding table;

receiving, by the reporting server, the data reporting request for a report of metadata associated with the one or more storage managers, wherein the data reporting request includes an indication of whether a search corresponding to the data reporting request is to be performed against a particular subset of the one or more local databases of the reporting server or all the local databases of the reporting server;

updating the one or more indices based on the one or more criteria, wherein updating comprises removing at least one index from the one or more indices where at least one table corresponding to the at least one index fails to satisfy at least one criterion from the one or more criteria;

producing, by the reporting server, a report based on processing the data reporting request using the one or more indices, wherein the one or more local databases is searched based on the indication included within the data reporting request; and sending, by the reporting server, the data report to a requesting user.

9. The method of claim 8, further comprising:

selecting one or more tables from the one or more local databases for indexing based on the one or more tables satisfying one or more criteria selected from the group comprising:

the one or more tables being a largest table in the one or more local databases; and the one or more tables being most frequently used within the one or more local databases.

10. The method of claim 8, further comprising:

determining whether a temporary location different from the one or more local databases includes the first copy of the live management database data; and wherein:

storing the first copy of the live management database data as the offline copy of management database data is based on a determination that the temporary location includes the first copy of the live management database data.

11. The method of claim 8, wherein the updating occurs according to at least one of:

a regular schedule;

a local database update; and based on a certain amount of data having been changed in the one or more tables of the one or more local databases.

12. The method of claim 8, further comprising:

removing, by the reporting server, the one or more indices based on analyzing queries submitted against the one or more management databases of the one or more storage managers.

13. The method of claim 8, further comprising:

storing a second copy of live management data at a temporary location different from the one or more local databases of the reporting server; and selectively incorporating the second copy of live management data stored at the temporary location into the one or more local databases by overwriting the data stored in the one or more local databases of the reporting server with the second copy of live management data.

14. The method of claim 8, further comprising:

storing a second copy of live management data at a temporary location different from the one or more local databases of the reporting server; and selectively incorporating the second copy of live management data stored at the temporary location into the one or more local databases by updating the data stored in the one or more local databases of the reporting server based on the second copy of live management data.

15. A non-transitory, computer-readable memory storing computer-executable instructions that, when executed by one or more processors, configure a system to perform a plurality of operations comprising:

receiving, from one or more storage managers, a first copy of live management database data associated with its corresponding storage manager, wherein each of the one or more storage managers is associated with a corresponding management database that stores the corresponding first copy of live management database data;

storing the first copy of the live management database data as an offline copy of management database data into one or more local databases of a reporting server;

prior to a data reporting request, building one or more indices for the one or more local databases based on selected one or more tables from the one or more local databases according to one or more criteria, wherein:

each table of the selected one or more tables satisfies the one or more criteria, and, a first criterion of the one or more criteria involves is based on a relative characteristic for a corresponding table of the selected one or more tables, wherein the relative characteristic is based on a specific time-frame of usage for the corresponding table;

receiving, by the reporting server, the data reporting request for a report of metadata associated with the one or more storage managers, wherein the data reporting request includes an indication of whether a search corresponding to the data reporting request is to be performed against a particular subset of the one or more local databases of the reporting server or all the local databases of the reporting server;

producing, by the reporting server, a report based on processing the data reporting request using the one or more indices, wherein the one or more local databases is searched based on the indication included within the data reporting request;

updating the one or more indices based on the one or more criteria, wherein updating comprises removing at least one index from the one or more indices where at least one table corresponding to the at least one index fails to satisfy at least one criterion from the one or more criteria; and sending, by the reporting server, the data report to a requesting user.

16. The non-transitory, computer-readable memory of claim 15, wherein the plurality of operations further comprises:

selecting one or more tables from the one or more local databases for indexing based on the one or more tables satisfying one or more criteria selected from the group comprising:

the one or more tables being a largest table in the one or more local databases; and the one or more tables being most frequently used within the one or more local databases.

17. The non-transitory, computer-readable memory of claim 15, wherein the plurality of operations further comprises:

determining whether a temporary location different from the one or more local databases includes the first copy of the live management database data; and wherein:

storing the first copy of the live management database data as the offline copy of management database data is based on a determination that the temporary location includes the first copy of the live management database data.

18. The non-transitory, computer-readable memory of claim 15, wherein the updating occurs according to at least one of:

a regular schedule;

a local database update; and based on a certain amount of data having been changed in the one or more tables of the one or more local databases.

19. The non-transitory, computer-readable memory of claim 15, wherein the plurality of operations further comprises:

storing a second copy of live management data at a temporary location different from the one or more local databases of the reporting server; and selectively incorporating the second copy of live management data stored at the temporary location into the one or more local databases by overwriting the data stored in the one or more local databases of the reporting server with the second copy of live management data.

20. The non-transitory, computer-readable memory of claim 15, wherein the plurality of operations further comprises:

storing a second copy of live management data at a temporary location different from the one or more local databases of the reporting server; and selectively incorporating the second copy of live management data stored at the temporary location into the one or more local databases by updating the data stored in the one or more local databases of the reporting server based on the second copy of live management data.

* * * * *